United States Patent
Pang et al.

(10) Patent No.: US 9,854,237 B2
(45) Date of Patent: Dec. 26, 2017

(54) AMVP AND MERGE CANDIDATE LIST DERIVATION FOR INTRA BC AND INTER PREDICTION UNIFICATION

(71) Applicant: QUALCOMM Incorporated, San Diego, CA (US)

(72) Inventors: Chao Pang, Marina del Ray, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 14/882,152

(22) Filed: Oct. 13, 2015

(65) Prior Publication Data
US 2016/0105670 A1 Apr. 14, 2016

Related U.S. Application Data

(60) Provisional application No. 62/063,857, filed on Oct. 14, 2014, provisional application No. 62/065,384,
(Continued)

(51) Int. Cl.
*H04N 19/105* (2014.01)
*H04N 19/70* (2014.01)
(Continued)

(52) U.S. Cl.
CPC ......... *H04N 19/105* (2014.11); *H04N 19/176* (2014.11); *H04N 19/52* (2014.11); *H04N 19/70* (2014.11)

(58) Field of Classification Search
CPC ...... H04N 19/105; H04N 19/70; H04N 19/52; H04N 19/176
See application file for complete search history.

(56) References Cited

U.S. PATENT DOCUMENTS

2014/0010287 A1* 1/2014 Wahadaniah .......... H04N 19/52
375/240.02
2014/0376634 A1 12/2014 Guo et al.
(Continued)

FOREIGN PATENT DOCUMENTS

WO 2015100726 A1 7/2015

OTHER PUBLICATIONS

Wiegand et al., "WD1 : Working Draft 1 of High-Efficiency Video Coding," JCTVC-C403, 3rd Meeting: Guangzhou, CN, Oct. 7-15, 2010 (Joint Collaborative Team on Video Coding of ISO/IEC JTC1/SC29/WG11 and ITU-T SG.16); Jan. 6, 2011, 137 pp.
(Continued)

*Primary Examiner* — Nam Pham
(74) *Attorney, Agent, or Firm* — Shumaker & Sieffert, P.A.

(57) ABSTRACT

A method of decoding video data comprising receiving a first block of video data in a first frame of video data, the first block of video data being encoded relative to a first predictive block in the first frame of video data, the first predictive block being identified by a block vector, and decoding the block vector using a motion vector prediction process and a same motion vector candidate list as used for decoding a motion vector, wherein the motion vector is used to identify an inter-frame predictive block for a second block of video data coded using inter coding.

30 Claims, 7 Drawing Sheets

Related U.S. Application Data filed on Oct. 17, 2014, provisional application No. 62/065,643, filed on Oct. 18, 2014, provisional application No. 62/109,323, filed on Jan. 29, 2015, provisional application No. 62/110,261, filed on Jan. 30, 2015.

(51) Int. Cl.
*H04N 19/52* (2014.01)
*H04N 19/176* (2014.01)

(56) References Cited

U.S. PATENT DOCUMENTS

| | | | |
|---|---|---|---|
| 2015/0063440 | A1 | 3/2015 | Pang et al. |
| 2015/0063454 | A1 | 3/2015 | Guo et al. |
| 2015/0071357 | A1 | 3/2015 | Pang et al. |
| 2015/0271487 | A1 | 9/2015 | Li et al. |
| 2016/0057420 | A1 | 2/2016 | Pang et al. |
| 2016/0100189 | A1 | 4/2016 | Pang et al. |

OTHER PUBLICATIONS

Wiegand et al., "WD2: Working Draft 2 of High-Efficiency Video Coding," JCTVC-D503, 4th Meeting: Daegu, KR, Jan. 20-28, 2011 (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, CH, Nov. 21-30, 2011 (Joint Collaborative Team on Video Coding of ISO/IEC JTC1/SC29/WG11 and ITU-T SG.16); JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012 (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012 (Joint Collaborative Team on Video Coding of ISO/IEC JTC1/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012 (Joint Collaborative Team on Video Coding of ISO/IEC JTC1/SC29/WG11 and ITU-T SG.16); JCTVC-J1003_d7, Jul. 28, 2012, 261 pp.

Bross et al., "High Efficiency Video Coding (HEVC) text specification draft 9," 11th Meeting: Shanghai, CN, Oct. 10-19, 2012 (Joint Collaborative Team on Video Coding of ISO/IEC JTC1/SC29/WG11 and ITU-T SG.16); JCTVC-K1003_v7, Nov. 2, 2012, 290 pp.

Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Li et al., "Non-SCCE1: Unification of Intra BC and Inter Modes," JCT-VC Meeting; Jun. 30-Jul. 9, 2014; Sapporo, JP (Joint Collaborative Team on Video Coding of ISO/IEC JTC1/SC29/WG11 and ITU-T SG.16 ); URL: http://wftp3.itu.int/av-arch/jctvc-site/ No. JCTVC-R0100_r1; Version 2, Jun. 29, 2014, XP030116357, 28 pp.

Pang et al., "SCCE1: Test 3.1—Block vector prediction method for Intra block copy," JCT-VC Meeting; Jun. 30-Jul. 9, 2014; Sapporo, JP (Joint Collaborative Team on Video Coding of ISO/IEC JTC1/SC29/WG11 and ITU-T SG.16); URL: http://wftp3.itu.int/av-arch/jctvc-site/, No. JCTVC-R0185-v2, Jul. 2, 2014, XP030116475, 8 pp.

Pang, "BoG report for block vector prediction methods for Intra block copy," JCT-VC Meeting; Jun. 30-Jul. 9, 2014; Sapporo, JP (Joint Collaborative Team on Video Coding of ISO/IEC JTC1/SC29/WG11 and ITU-T SG.16 ); URL: http://wftp3.itu.int/av-arch/jctvc-site/, No. JCTVC-R0349, Jul. 4, 2014, XP030116670, 6 pp.

Seregin et al., "TMVP constraint for intra block copy with constrained intra prediction enabled," JCT-VC Meeting; Oct. 15-21, 2015; Geneva, CH (Joint Collaborative Team on Video Coding of ISO/IEC JTC1/SC29/WG11 and ITU-T SG.16 ); URL: http://wftp3.itu.int/av-arch/jctvc-site/,, No. JCTVC-V0045, Oct. 6, 2015, XP030117692, 2 pp.

Xu et al., "On unification of intra block copy and Inter-picture motion compensation," JCT-VC Meeting; Jan. 9-17, 2014; San Jose, CA, USA (Joint Collaborative Team on Video Coding of ISO/IEC JTC1/SC29/WG11 and ITU-T SG.16); URL: http://wftp3.itu.int/av-arch/jctvc-site/, No. JCTVC-Q0132-v5, Apr. 3, 2014, XP030116062, 14 pp.

Wang et al., "High Efficiency Video Coding (HEVC) Defect Report 2," JCT-VC Meeting; Oct. 23-Nov. 1, 2013 (Joint Collaborative Team on Video Coding of ISO/IEC JTC1/SC29/WG11 and ITU-T SG.16); No. JCTVC-O1003_v2, Nov. 24, 2013; 311 pp.

Flynn et al., "High Efficiency Video Coding (HEVC) Range Extensions text specification: Draft 7," JCT-VC Meeting; Mar. 27-Apr. 4, 2014 (Joint Collaborative Team on Video Coding of ISO/IEC JTC1/SC29/WG11 and ITU-T SG.16); No. JCTVC-Q1005_v4; Apr. 10, 2014; 376 pp.

Joshi et al., "High Efficiency Video Coding (HEVC) Screen Content Coding: Draft 1," JCT-VC Meeting; Jun. 30-Jul. 9, 2014 (Joint Collaborative Team on Video Coding of ISO/IEC JTC1/SC29/WG11 and ITU-T SG.16); No. JCTVC-R1005_v3; Sep. 27, 2014; 362 pp.

International Search Report and Written Opinion from International Application No. PCT/US2015/055556, dated Jan. 18, 2016, 14 pp.

Response to Written Opinion, dated Jan. 18, 2016, from International Application No. PCT/US2015/055556, filed on Jul. 18, 2016, 5 pp.

Second Written Opinion from International Application No. PCT/US2015/055556, dated Sep. 22, 2016, 8 pp.

Pang, et al., "Non-CE2: Zero merging candidates derivation for Intra BC/Inter signalling unification," JCT-VC Meeting; Feb. 10-18, 2015; (Joint Collaborative Team on Video Coding of ISO/IEC JTC1/SC29/WG11 and ITU-T SG.16); No. JCTVC-T0098-r1; Feb. 11, 2015, 5 pp.

Liu, et al., "Description of Core Experiment 2 (CE2): Intra block copy relationship to inter coding," JCT-VC Meeting; Oct. 17-24, 2014; (Joint Collaborative Team on Video Coding of ISO/IEC JTC1/SC29/WG11 and ITU-T SG.16); Nov. 24, 2014; No. JCTVC-S1102, 5 pp.

Yu, et al., "Common Test Conditions for Screen Content Coding," JCT-VC Meeting; Oct. 17-24, 2014; (Joint Collaborative Team on Video Coding of ISO/IEC JTC1/SC29/WG11 and ITU-T SG.16); Nov. 22, 2014, No. JCTVC-S1015_r1; 6 pp.

(56) References Cited

OTHER PUBLICATIONS

Response to Second Written Opinion from corresponding PCT Application Serial No. PCT/US2015/055556 filed on Nov. 15, 2016 (22 pages).
International Preliminary Report on Patentability from corresponding PCT Application Serial No. PCT/US2015/055556 dated Dec. 7, 2016 (23 pages).

* cited by examiner

AMVP AND MERGE CANDIDATE LIST DERIVATION FOR INTRA BC AND INTER PREDICTION UNIFICATION

This application claims the benefit of U.S. Provisional Application No. 62/063,857, filed Oct. 14, 2014, U.S. Provisional Application No. 62/065,384, filed Oct. 17, 2014, U.S. Provisional Application No. 62/065,643, filed Oct. 18, 2014, U.S. Provisional Application No. 62/109,323, filed Jan. 29, 2015, and U.S. Provisional Application No. 62/110,261, filed Jan. 30, 2015, the entire contents of each of which are incorporated by reference herein.

TECHNICAL FIELD

This disclosure relates to video coding and, more particularly, prediction of video blocks based on other video blocks.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra picture) prediction and/or temporal (inter picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra coded (I) slice of a picture are encoded using spatial prediction with respect to reference samples in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter coded block is encoded according to a motion vector that points to a block of reference samples forming the predictive block, and the residual data indicating the difference between the coded block and the predictive block. An intra coded block is encoded according to an intra coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for motion vector and block vector prediction in video coding. The techniques of this disclosure may be used for blocks of video data coded relative to a predictive block in another frame of video data and for blocks of video data coded relative to a predictive block in the same frame of video data (e.g., a block coded according to an intra block copy mode).

In one example, this disclosure describes a method of decoding video data that comprises receiving a first block of video data in a first frame of video data, the first block of video data being encoded relative to a first predictive block in the first frame of video data, the first predictive block being identified by a block vector, and decoding the block vector using a motion vector prediction process and a same motion vector candidate list as used for decoding a motion vector, wherein the motion vector is used to identify an inter-frame predictive block for a second block of video data coded using inter coding.

In another example, this disclosure describes an apparatus configured to decode video data, the apparatus comprising a memory configured to store video data, and a video decoder configured to receive a first block of video data in a first frame of video data, the first block of video data being encoded relative to a first predictive block in the first frame of video data, the first predictive block being identified by a block vector, and decode the block vector using a motion vector prediction process and a same motion vector candidate list as used for decoding a motion vector, wherein the motion vector is used to identify an inter-frame predictive block for a second block of video data coded using inter coding.

In another example, this disclosure describes a method of encoding video data, the method comprising encoding a first block of video data in a first frame of video data, the first block of video data being encoded relative to a first predictive block in the first frame of video data, the first predictive block being identified by a block vector, and encoding the block vector using a motion vector prediction process and a same motion vector candidate list as used for decoding a motion vector, wherein the motion vector is used to identify an inter-frame predictive block for a second block of video data coded using inter coding.

In another example, this disclosure describes an apparatus configured to decode video data, the apparatus comprising means for receiving a first block of video data in a first frame of video data, the first block of video data being encoded relative to a first predictive block in the first frame of video data, the first predictive block being identified by a block vector, and means for decoding the block vector using a motion vector prediction process and a same motion vector candidate list as used for decoding a motion vector, wherein the motion vector is used to identify an inter-frame predictive block for a second block of video data coded using inter coding.

The details of one or more examples are set forth in the accompanying drawings and the description below. Other features, objects, and advantages will be apparent from the description, drawings, and claims.

DETAILED DESCRIPTION

Figure 1:
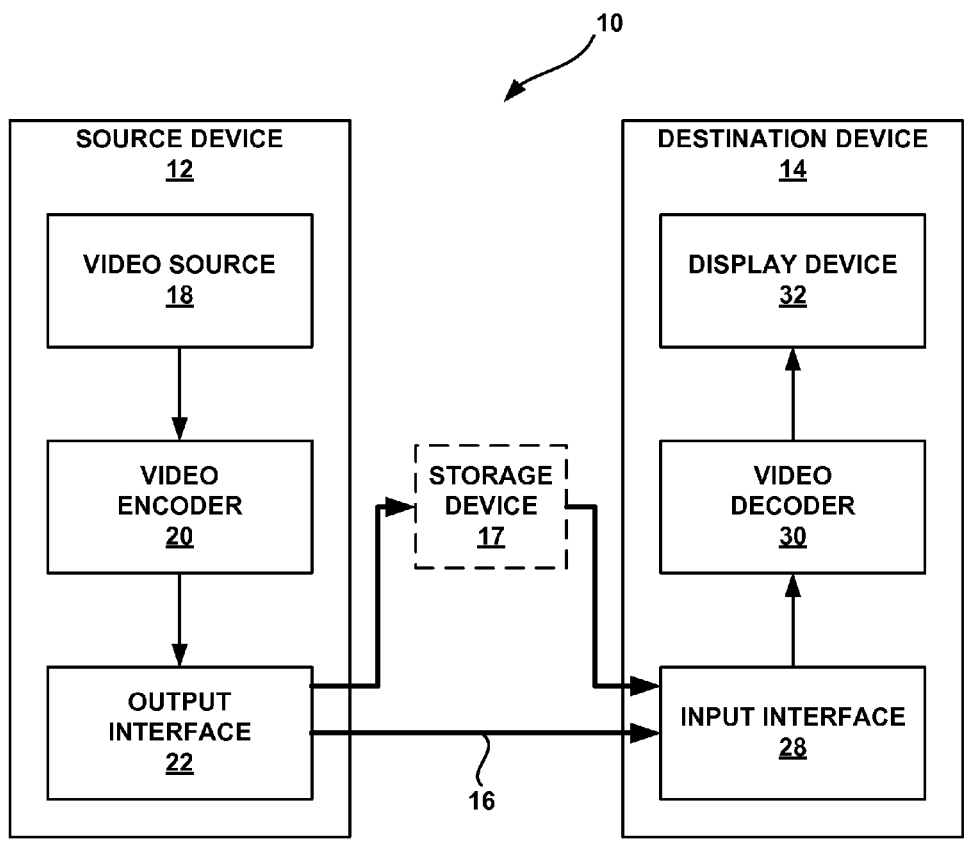
FIG. 1 is a block diagram illustrating an example video encoding and decoding system that may utilize the techniques described in this disclosure.

Various video coding standards, including the recently developed High Efficiency Video Coding (HEVC) standard include predictive coding modes for video blocks, where a block currently being coded is predicted based on an already coded block of video data. In an intra prediction mode, the current block is predicted based on one or more previously coded, neighboring blocks in the same picture as the current block, while in an inter prediction mode the current block is predicted based on an already coded block in a different picture. In an inter prediction mode, the process of determining a block of a previously-coded frame to use as a predictive block is sometimes referred to as motion estimation. Motion estimation is generally performed by a video encoder, and the process of identifying and retrieving a predictive block is sometimes referred to as motion compensation, which is performed by both video encoders and video decoders. The predictive block in the previously-coded frame may be identified by a motion vector. A motion vector may indicate the location of a predictive block relative to a point in the currently-coded block (e.g., the upper left corner of the current block).

A video encoder typically determines how to code a sequence of video data by coding the video data using multiple coding scenarios and identifying the coding scenario that produces a desirable rate-distortion tradeoff. When testing intra prediction coding scenarios for a particular video block, a video encoder typically tests the neighboring row of pixels (e.g., the row of pixels immediately above the block being coded) and tests the neighboring column of pixels (e.g., the column of pixels immediately to the left of the block being coded). In contrast, when testing inter prediction scenarios, the video encoder typically identifies candidate predictive blocks in a much larger search area, where the search area corresponds to video blocks in any location in a previously-coded frame of video data.

For certain types of video images, such as video images that include text, symbols, or repetitive patterns, coding gains can be achieved relative to intra prediction and inter prediction by using an intra motion compensation (IMC) mode. IMC mode is sometimes also referred to as intra block copy (IBC) mode. In this disclosure, the terms IMC mode and IBC mode are interchangeable. In an IBC mode, a video encoder searches for a predictive block in the same frame or picture as the block being coded, as in an intra prediction mode, but the video encoder searches a wider search area and not just the neighboring rows and columns. The wider search area may comprise any area of the frame that has been coded prior to coding the current block of video data.

In IBC mode, the video encoder may determine an offset vector, also referred to sometimes as a motion vector or block vector, for identifying the predictive block within the same frame or picture as the block being predicted. The block vector includes, for example, an x-component and a y-component, where the x-component identifies the horizontal displacement between a video block being predicted and the predictive block, and where the y-component identifies a vertical displacement between the video block being predicted and the predictive block. The video encoder signals, in the encoded bitstream, the determined block vector so that a video decoder, when decoding the encoded bitstream, can identify the predictive block selected by the video encoder. In general, an IMC and/or IBC coding mode is any coding mode where a block of video data is predicted from a predictive block of video from the same frame as the current block of video data, and where the predictive block of video data is identified by an offset vector (e.g., a block vector or motion vector).

This disclosure introduces techniques to efficiently unify IBC mode and an inter prediction mode. The proposed techniques are mainly directed to, but not limited, motion/block vector prediction techniques, including motion/block vector candidate list derivation. The techniques of this disclosure may be applicable for use with any video coding techniques that may use an inter prediction mode and an IBC mode, including video coding techniques that employ screen content coding, including the support of possibly high bit depth (e.g. more than 8 bit) and different chroma sampling formats such as 4:4:4, 4:2:2, 4:2:0, 4:0:0 and etc.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to either video encoding or video decoding. Video encoder 20 and video decoder 30 of video coding system 10 represent examples of devices that may be configured to perform techniques for motion vector and block vector prediction in accordance with various examples described in this disclosure.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Various implementations of source device 12, destination device 14, or both, may include one or more processors and memory coupled to the one or more processors. The memory may include, but is not limited to RAM, ROM, EEPROM, flash memory, or any other medium that can be used to store desired program code in the form of instructions or data structures and that can be accessed by a computer, as described herein.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a link 16. Link 16 may comprise one or more media or devices capable of moving the encoded video data from source device 12 to destination device 14. In one example, link 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, encoded data may be output from output interface 22 to a storage device 17. Similarly, encoded data may be accessed from storage device 17 by input interface 28. Storage device 17 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In a further example, storage device 17 may correspond to a file server or another intermediate storage device that may hold the encoded video generated by source device 12. Destination device 14 may access stored video data from storage device 17 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 17 may be a streaming transmission, a download transmission, or a combination of both.

The techniques of this disclosure for motion vector and block vector prediction in video coding are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage device 17 for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over link 16 and/or from storage device 17. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

Video encoder 20 and video decoder 30 may operate according to a video compression standard, such as the High Efficiency Video Coding (HEVC), and may conform to the HEVC Test Model (HM). A working draft of the HEVC standard, referred to as "HEVC Working Draft 10" or "HEVC WD10," is described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013. The techniques described in this disclosure may also operate according to extensions of the HEVC standard that are currently in development. Alternatively or additionally, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In one example, video decoder 30 may be configured to receive a first block of video data in a first frame of video data, the first block of video data being encoded relative to a first predictive block in a second frame of video data, the first predictive block being identified by a motion vector, receive a second block of video data in the first frame of video data, the second block of video data being encoded relative to a second predictive block in the first frame of video data, the second predictive block being identified by a block vector, decode the motion vector using a motion vector prediction process and a motion vector candidate list, and decode the block vector using the motion vector prediction process and the same motion vector candidate list as used for decoding the motion vector.

In another example, video encoder 20 may be configured to encode a first block of video data in a first frame of video data relative to a first predictive block in a second frame of video data, the first predictive block being identified by a motion vector, encode a second block of video data in the first frame of video data relative to a second predictive block in the first frame of video data, the second predictive block being identified by a block vector, encode the motion vector using a motion vector prediction process and a motion vector candidate list, and encode the block vector using the motion vector prediction process and the same motion vector candidate list as used for decoding the motion vector.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). One version of the HEVC draft specification, and referred to as HEVC WD hereinafter, is available from http://phenix.int-evry.fr/jct/doc_end_user/documents/15_Geneva/wg11/JCTVC-O1003-v2.zip. The Range Extensions to HEVC, namely HEVC RExt, is also being developed by the JCT-VC. A recent Working Draft (WD) of Range extensions, referred to as RExt WD7 hereinafter, is available from http://phenix.int-evry.fr/jct/doc_end_user/documents/17_Valencia/wg11/JCTVC-Q1005-v4.zip.

The HEVC specification text set forth in JCTVC-Q1003 is often referred to as HEVC version 1. The range extension specification may become the version 2 of the HEVC. However, to a large extent, as far as the proposed techniques are concerned, e.g., motion vector prediction, the HEVC version 1 and the range extension specification are technically similar. Therefore whenever this disclosure refers to techniques based on HEVC version 1, the same techniques may also apply to the range extension specification, and whenever this techniques refers to reusing any HEVC version 1 modules, this disclosure also refers to reusing HEVC range extension modules (e.g., with the same sub-clauses).

Recently, investigation of new coding tools for screen-content material such as text and graphics with motion was requested, and technologies that improve the coding efficiency for screen content have been proposed. Because there is evidence that significant improvements in coding efficiency can be obtained by exploiting the characteristics of screen content with novel dedicated coding tools, a Call for Proposals (CfP) is being issued with the target of possibly developing future extensions of the High Efficiency Video Coding (HEVC) standard including specific tools for screen content coding (SCC). Companies and organizations are invited to submit proposals in response to this Call. The use cases and requirements of this CfP are described in MPEG document N14174. During the 17$^{th}$ JCT-VC meeting, SCC test model (SCM) is established. A recent Working Draft (WD) of SCC is available from http://phenix.int-evry.fr/jct/doc_end_user/documents/18_Sapporo/wg11/JCTVC-R1005-v3.zip.

The JCT-VC developed the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra prediction encoding modes, the HM may provide as many as thirty-three intra prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU is defined as basic coding unit in HEVC. In HEVC, a frame is first divided into a number of square units called a CTU (Coding Tree Unit). Let CTU size be 2N×2N. Each CTU can be divided into 4 N×N CUs, and each CU can be further divided into 4 (N/2)×(N/2) units. The block splitting can continue in the same way until it reaches the predefined maximum splitting level or the allowed smallest CU size. The size of the CTU, the levels of further splitting CTU into CU and the smallest size of CU are defined in the encoding configurations, and will be sent to video decoder 30 or may be known to both video encoder 20 and video decoder 30.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra prediction mode encoded, or inter prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra mode encoded, the PU may include data describing an intra prediction mode for the PU. As another example, when the PU is inter mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra prediction in PU sizes of 2N×2N or N×N, and inter prediction in symmetric PU sizes of 2N×2N, 2N×N, N×2N, or N×N. The HM also supports asymmetric partitioning for inter prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Thus, according to the HEVC, a CU may include one or more prediction units (PUs) and/or one or more transform units (TUs). This disclosure also uses the term "block", "partition," or "portion" to refer to any of a CU, PU, or TU. In general, "portion" may refer to any sub-set of a video frame. Further, this disclosure typically uses the term "video block" to refer to a coding node of a CU. In some specific cases, this disclosure may also use the term "video block" to refer to a treeblock, i.e., LCU, or a CU, which includes a coding node and PUs and TUs. Thus, a video block may correspond to a coding node within a CU and video blocks may have fixed or varying sizes, and may differ in size according to a specified coding standard.

A video sampling format, which may also be referred to as a chroma format, may define the number of chroma samples included in a CU with respect to the number of luma samples included in a CU. Depending on the video sampling format for the chroma components, the size, in terms of number of samples, of the U and V components may be the same as or different from the size of the Y component. In the HEVC standard, a value of the syntax element chroma_format_idc is defined to indicate different sampling formats of the chroma components, relative to the luma component. In HEVC, the chroma_format_idc syntax element is signaled in the sequence parameter set (SPS). Table 1 illustrates the relationship between values of chroma_format_idc and associated chroma formats.

TABLE 1 different chroma formats defined in HEVC

| chroma_format_idc | chroma format | SubWidthC | SubHeightC |
|---|---|---|---|
| 0 | monochrome | — | — |
| 1 | 4:2:0 | 2 | 2 |
| 2 | 4:2:2 | 2 | 1 |
| 3 | 4:4:4 | 1 | 1 |

In Table 1, the variables SubWidthC and SubHeightC can be used to indicate the horizontal and vertical sampling rate ratio between the number of samples for the luma component and the number of samples for each chroma component. In the chroma formats described in Table 1, the two chroma components have the same sampling rate. Thus, in 4:2:0 sampling, each of the two chroma arrays has half the height and half the width of the luma array, while in 4:2:2 sampling, each of the two chroma arrays has the same height and half the width of the luma array. In 4:4:4 sampling, each of the two chroma arrays, may have the same height and width as the luma array, or in some instances, the three color planes may all be separately processed as monochrome sampled pictures.

In the example of Table 1, for the 4:2:0 format, the sampling rate for the luma component is twice that of the chroma components for both the horizontal and vertical directions. As a result, for a coding unit formatted according to the 4:2:0 format, the width and height of an array of samples for the luma component are twice that of each array of samples for the chroma components. Similarly, for a coding unit formatted according to the 4:2:2 format, the width of an array of samples for the luma component is twice that of the width of an array of samples for each chroma component, but the height of the array of samples for the luma component is equal to the height of an array of samples for each chroma component. For a coding unit formatted according to the 4:4:4 format, an array of samples for the luma component has the same width and height as an array of samples for each chroma component.

It should be noted that in addition to the YUV color space, video data can be defined according to an RGB space color. In this manner, the chroma formats described herein may apply to either the YUV or RGB color space. RGB chroma formats are typically sampled such that the number of red samples, the number of green samples and the number of blue samples are equal. Thus, the term "4:4:4 chroma format" as used herein may refer to either a YUV color space or an RGB color space wherein the number of samples is equal for all color components.

Following intra predictive or inter predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive binary arithmetic coding (CABAC) or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not.

Figure 2:
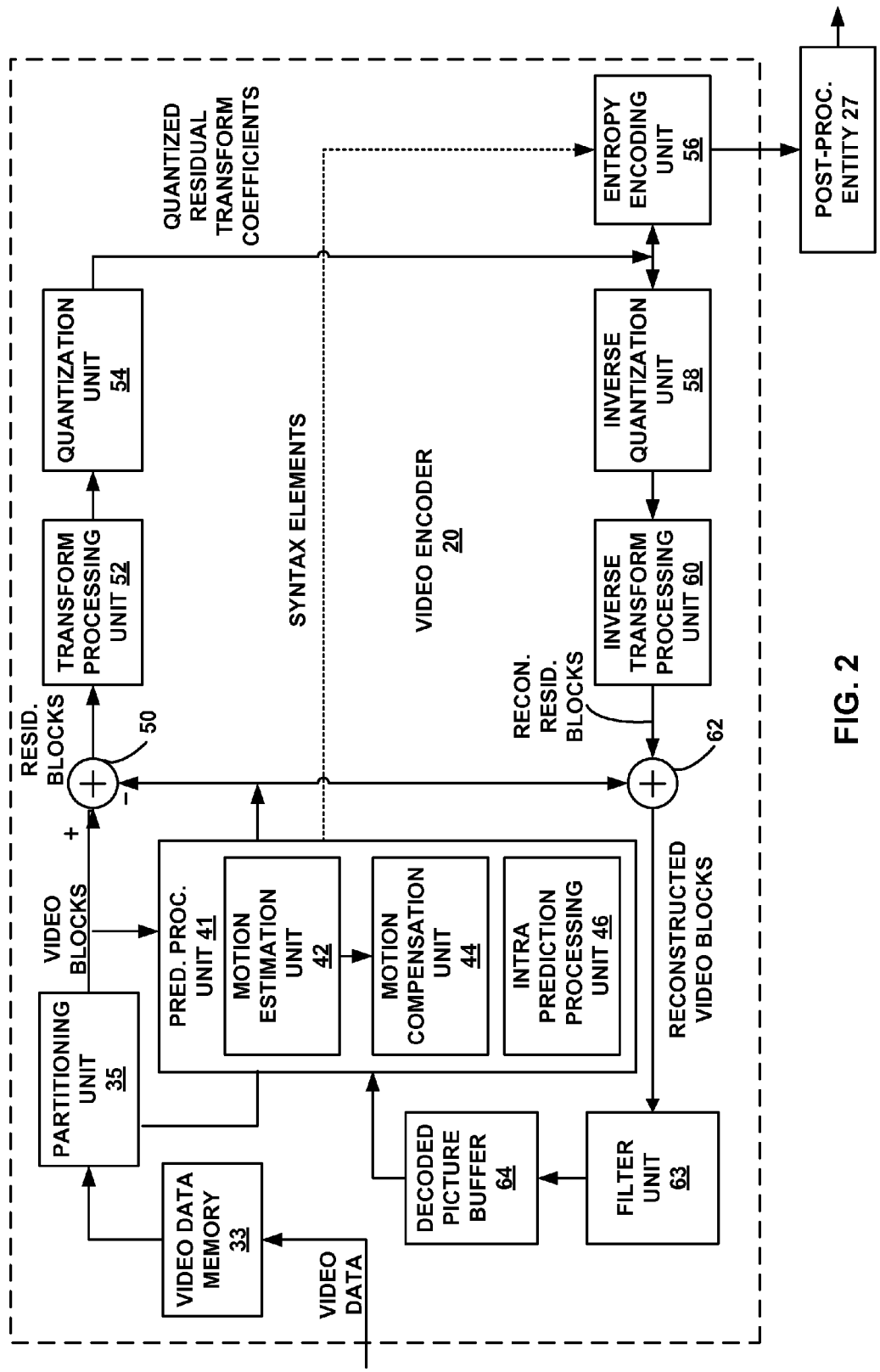
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may be configured to output video to post-processing entity 27. Post-processing entity 27 is intended to represent an example of a video entity, such as a media-aware network element (MANE) or splicing/editing device that may process encoded video data from video encoder 20. In some instances, post-processing entity 27 may be an example of a network entity. In some video encoding systems, post-processing entity 27 and video encoder 20 may be parts of separate devices, while in other instances, the functionality described with respect to post-processing entity 27 may be performed by the same device that comprises video encoder 20. In some example, post-processing entity 27 is an example of storage device 17 of FIG. 1.

Video encoder 20 may perform intra, inter, and IBC coding of video blocks within video slices in accordance with the techniques of this disclosure. Intra coding relies on spatial prediction to reduce or remove spatial redundancy in video within a given video frame or picture. Inter coding relies on temporal prediction to reduce or remove temporal redundancy in video within adjacent frames or pictures of a video sequence. Intra mode (I mode) may refer to any of several spatial based compression modes. Inter modes, such as uni-directional prediction (P mode) or bi-prediction (B mode), may refer to any of several temporal-based compression modes. IBC coding modes, as will be described in more detail below, may remove spatial redundancy from a frame of video data, but unlike tradition intra modes, IBC coding codes may be used to locate predictive blocks in a larger search area within the same frame as the currently-coded block and refer to the predictive blocks with blocks vectors, rather than relying on intra prediction coding modes.

In the example of FIG. 2, video encoder 20 includes video data memory 33, partitioning unit 35, prediction processing unit 41, filter unit 63, decoded picture buffer (DPB) 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

Video data memory 33 may store video data to be encoded by the components of video encoder 20. The video data stored in video data memory 33 may be obtained, for example, from video source 18. DPB 64 may be a reference picture memory that stores reference video data for use in encoding video data by video encoder 20, e.g., in intra, inter, or IBC coding modes. Video data memory 33 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 64 may be provided by the same memory device or separate memory devices. In various examples, video data memory 33 may be on-chip with other components of video encoder 20, or off-chip relative to those components.

As shown in FIG. 2, video encoder 20 receives video data and stores the video data in video data memory 33. Partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes, one of a plurality of inter coding modes, or one of a plurality of IBC coding modes, for the current video block based on error results (e.g., coding rate and the level of distortion). Prediction processing unit 41 may provide the resulting intra, inter, or IBC coded block to summer 50 to generate residual block data and to summer 62 to reconstruct the encoded block for use as a reference picture.

Intra prediction processing unit 46 within prediction processing unit 41 may perform intra predictive coding of the current video block relative to one or more neighboring blocks in the same frame or slice as the current block to be coded to provide spatial compression. Motion estimation unit 42 and motion compensation unit 44 within prediction processing unit 41 may perform inter predictive coding of the current video block relative to one or more predictive blocks in one or more reference pictures to provide temporal compression. Motion estimation unit 42 and motion compensation unit 44 within prediction processing unit 41 may also perform IBC coding of the current video block relative to one or more predictive blocks in the same picture to provide spatial compression.

In this regard, IBC and inter prediction coding may be considered to be unified. That is, both inter prediction and IBC coding predict a current block from another, previously-coded block. The position of the previously-coded block may be identified by a motion vector or a block vector. In general, a motion vector may be used to identify a previously-coded block in a different frame than the frame of the currently-coded block (e.g., as in inter prediction). A block vector may be used to identify a previously-coded block in the same frame as the frame of the currently-coded block (e.g., as in IBC mode). It should be understood that a block vector may be also referred to as a motion vector, even though the block vector does not relate to any motion of a particular object in a frame.

To perform IBC using motion estimation unit 42, and motion estimation unit 44, the reference frame index of the current frame (e.g., the frame of the currently-coded block) may be added to the reference picture list. In this way, motion estimation unit 42 may search for predictive blocks in different frames than the currently-coded block as well as the same frame as the currently-coded block. If the predictive block has the same reference frame index as the currently-coded block, video encoder 20 and/or video decoder 30 may be considered as having coded the current block using IBC mode. In this way, video encoder 20 need not signal a separate syntax element indicating IBC mode, but rather, IBC mode may be inferred from the reference frame index of the predictive block.

Motion estimation unit 42 may be configured to determine the inter prediction mode or IBC mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture. In the case of IBC coding, a motion vector, which may be referred to as a block vector in IBC, may indicate the displacement of a PU of a video block within a current video frame or picture relative to a predictive block within the current video frame.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

According to some techniques of this disclosure, when coding a video block using an IBC mode, motion estimation unit 42 may determine a motion vector, or block vector, for a luma component of the video block, and determine an block vector for a chroma component of the video block based on the block vector for the luma component. In another example, when coding a video block using an IBC mode, motion estimation unit 42 may determine a motion vector, or block vector, for a chroma component of the video block, and determine an offset vector for a luma component of the video block based on the block vector for the chroma component. Thus, video encoder 20 may signal in the bitstream only one block vector, from which block vectors for both chroma and luma components of the video block may be determined.

Motion compensation, performed by motion compensation unit 44, may involve fetching or generating the predictive block based on the motion/block vector determined by motion estimation, possibly performing interpolations to sub-pixel precision. Interpolation filtering may generate additional pixel samples from known pixel samples, thus potentially increasing the number of candidate predictive blocks that may be used to code a video block. Upon receiving the motion vector for the PU of the current video block, motion compensation unit 44 may locate the predictive block to which the motion vector points in one of the reference picture lists. In the case of the IBC coding, the block vector may point to the picture being coded. As mentioned above, the current picture may also be included in the reference picture list. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

In some examples, prediction processing unit 41 may also perform motion vector and/or block vector prediction. That is, rather than signaling the entirety of the motion vector and/or block vector used to encode a block of video data, the motion vector and/or block vector may be predicted relative to a motion vector and/or block vector of a neighboring block. As will be discussed in more detail below, this disclosure describes techniques for motion vector and block vector prediction for both inter prediction and IBC coding modes.

Intra prediction processing unit 46 may perform intra prediction on a current block, as an alternative to the inter prediction and IBC performed by motion estimation unit 42 and motion compensation unit 44, as described above. In particular, intra prediction processing unit 46 may determine an intra prediction mode to use to encode a current block. In some examples, intra prediction processing unit 46 may encode a current block using various intra prediction modes, e.g., during separate encoding passes, and intra prediction processing unit 46 may select an appropriate intra prediction mode to use from the tested modes. For example, intra prediction processing unit 46 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. intra prediction processing unit 46 may calculate ratios from the distortions and rates for the various encoded blocks to determine which intra prediction mode exhibits the best rate-distortion value for the block.

In any case, after selecting an intra prediction mode for a block, intra prediction processing unit 46 may provide information indicative of the selected intra prediction mode for the block to entropy encoding unit 56. Entropy encoding unit 56 may encode the information indicating the selected intra prediction mode in accordance with the techniques of this disclosure. Video encoder 20 may include in the transmitted bitstream configuration data, which may include a plurality of intra prediction mode index tables and a plurality of modified intra prediction mode index tables (also referred to as codeword mapping tables), definitions of encoding contexts for various blocks, and indications of a most probable intra prediction mode, an intra prediction mode index table, and a modified intra prediction mode index table to use for each of the contexts.

After prediction processing unit 41 generates the predictive block for the current video block via either inter prediction, intra prediction, or IBC, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Interpolation filtering may generate additional pixel samples from known pixel samples, thus potentially increasing the number of candidate predictive blocks that may be used to code a video block. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block for inter predicting a block in a subsequent video frame or picture.

Figure 3:
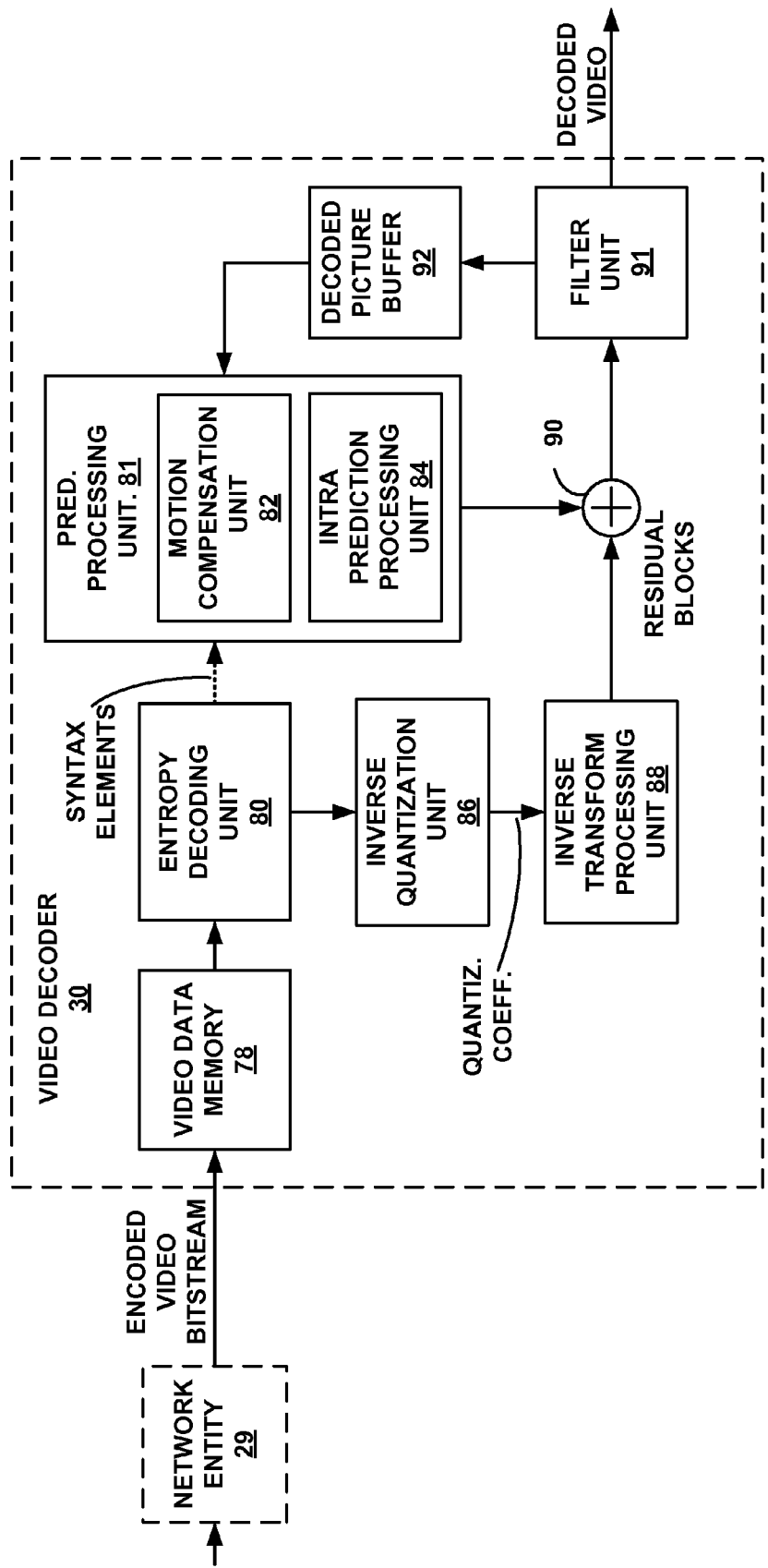
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes a video data memory 78, entropy decoding unit 80, prediction processing unit 81, inverse quantization unit 86, inverse transform processing unit 88, summer 90, filter unit 91, and decoded picture buffer 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives video data, e.g. an encoded video bitstream that represents video blocks of an encoded video slice and associated syntax elements, from video encoder 20. Video decoder 30 may receive the video data from network entity 29 and store the video data in video data memory 78. Video data memory 78 may store video data, such as an encoded video bitstream, to be decoded by the components of video decoder 30. The video data stored in video data memory 78 may be obtained, for example, from storage device 17, e.g., from a local video source, such as a camera, via wired or wireless network communication of video data, or by accessing physical data storage media. Video data memory 78 may form a coded picture buffer (CPB) that stores encoded video data from an encoded video bitstream. Thus, although shown separately in FIG. 3, video data memory 78 and DPB 92 may be provided by the same memory device or separate memory devices. Video data memory 78 and DPB 92 may be formed by any of a variety of memory devices, such as dynamic random access memory (DRAM), including synchronous DRAM (SDRAM), magnetoresistive RAM (MRAM), resistive RAM (RRAM), or other types of memory devices. In various examples, video data memory 78 may be on-chip with other components of video decoder 30, or off-chip relative to those components.

Network entity 29 may, for example, be a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30. Network entity 29 may be an example of storage device 17 of FIG. 1 in some cases.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter coded (i.e., B, or P) slice or when a block is IBC coded, motion compensation unit 82 of prediction processing unit 81 produces predictive blocks for a video block of the current video slice based on the motion vectors and other syntax elements received from entropy decoding unit 80. For inter prediction, the predictive blocks may be produced from one of the reference pictures within one of the reference picture lists. Video decoder 30 may construct the reference frame lists, List 0 and List 1, using default construction techniques based on reference pictures stored in DPB 92. For IBC coding, the predictive blocks may be produced from the same picture as the block being predicted. The reference frame index for the current picture may be included in one or more of reference frame List 0 and List 1. In some examples, rather than signaling a specific syntax element indicating that IBC mode was used to code a particular block, video decoder 30 may be configured to infer IBC mode from a reference frame index that points to the current picture (e.g., the predictive block for the current block is from the same picture as the current block).

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

In some examples, prediction processing unit 81 may also perform motion vector and/or block vector prediction. That is, rather than receiving the entirety of the motion vector and/or block vector used to encode a block of video data, the motion vector and/or block vector may be predicted relative to a motion vector and/or block vector of a neighboring block. As will be discussed in more detail below, this disclosure describes techniques for motion vector and block vector prediction for both inter prediction and IBC coding modes.

According to some techniques of this disclosure, when coding a video block using an IBC mode, motion compensation unit 82 may determine a motion vector, or block vector, for a luma component of the video block, and determine a motion vector for a chroma component of the video block based on the motion vector for the luma component. In another example, when coding a video block using an IBC mode, motion compensation unit 82 may determine a motion vector, or block vector, for a chroma component of the video block, and determine a motion vector for a luma component of the video block based on the motion vector for the chroma component. Thus, video decoder 30 may receive in the bitstream only one block vector, from which offset vectors for both chroma and luma components of the video block may be determined.

When decoding a video block using IBC mode, motion compensation unit 82 may, for example, modify a motion vector, referred to as block offset vector for IBC mode, for a luma component to determine an block vector for a chroma component. Motion compensation unit 82 may, for example, modify one or both of an x-component and y-component of the block vector of the luma block based on a sampling format for the video block and based on a precision of a sub-pixel position to which the block vector points. For example, if the video block is coded using the 4:2:2 sampling format, then motion compensation unit 82 may only modify the x-component, not the y-component, of the luma offset vector to determine the offset vector for the chroma component.

In another example, if the video block is coded using the 4:2:0 sampling format, then motion compensation unit 82 may modify either or both of the x-component and the y-component of the luma block vector to determine the block vector for the chroma component. Motion compensation unit 82 may only modify the luma block vector, if when used for locating a chroma predictive block, the luma block vector points to a position without a chroma sample (e.g., at a sub-pixel position in the chroma sample of the current picture that includes the current block). If the luma block vector, when used to locate a chroma predictive block, points to a position where a chroma sample is present, then motion compensation unit 82 may not modify the luma block vector.

Motion compensation unit 82 may modify a luma block vector to generate a modified motion vector, also referred to as a modified block vector. Motion compensation unit 82 may modify a luma block vector that, when used to locate a chroma predictive block, points to a sub-pixel position such that the modified block vector, used for the chroma block, points to a lower resolution sub-pixel position or to an integer pixel position. As one example, a luma offset vector that points to a ⅛ pixel position may be modified to point to a ¼ pixel position, a luma block vector that points to a ¼ pixel position may be modified to point to a ½ pixel position, etc. In other examples, motion compensation unit 82 may modify the luma block vector such that the modified block vector always points to an integer pixel position for locating the chroma reference block. Modifying the luma block vector to point to a lower resolution sub-pixel position or to an integer pixel position may eliminate the need for some interpolation filtering and/or reduce the complexity of any needed interpolation filtering.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in decoded picture buffer 92, which stores reference pictures used for subsequent motion compensation. Decoded picture buffer 92 may be part of a memory that also stores decoded video for later presentation on a display device, such as display device 32 of FIG. 1, or may be separate from such a memory.

The following section will discuss addition features of video coding that are relevant to the techniques of this disclosure for motion vector and block vector prediction.

For each block coded with inter prediction, a set of motion information may be available. A set of motion information contains motion information for forward and backward prediction directions. Here, forward and backward prediction directions are two prediction directions of a bi-directional prediction mode and the terms "forward" and "backward" do not necessarily have a geometric meaning. Instead the terms "forward" and "backward" correspond to reference picture List 0 (RefPicList0) and reference picture List 1 (RefPicList1) of a current picture. When only one reference picture list is available for a picture or slice, only RefPicList0 is available and the motion information of each block of a slice is always forward.

For each prediction direction, the motion information may contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector may have a horizontal and a vertical component.

Picture order count (POC) is widely used in video coding standards to identify a display order of a picture. Although there are cases where two pictures within one coded video sequence may have the same POC value, it typically doesn't happen within a coded video sequence. When multiple coded video sequences are present in a bitstream, pictures with a same value of POC may be closer to each other in terms of decoding order.

POC values of pictures are typically used for reference picture list construction, derivation of reference picture set as in HEVC and motion vector scaling.

In HEVC, the largest coding unit in a slice is called a coding tree block (CTB). A CTB contains a quad-tree, the nodes of which are coding units. The size of a CTB can range from 16×16 to 64×64 in the HEVC main profile (although technically 8×8 CTB sizes can be supported). A CU could be the same size of a CTB although and as small as 8×8. Each CU is coded with one mode. When a CU is inter coded, it may be further partitioned into two prediction units (PUs) or become just one PU when further partition does not apply. When two PUs are present in one CU, the PUs may be half size rectangles or two rectangle size with ¼ or ¾ size of the CU.

When the CU is inter coded, one set of motion information is present for each PU. In addition, each PU is coded with a unique inter prediction mode to derive the set of motion information. In HEVC, the smallest PU sizes are 8×4 and 4×8.

In some examples, rather than directly signaling the original motion vector, the encoder may predict a motion vector for each partition, i.e., for each PU. In performing this motion vector prediction, video encoder 20 may determine a set of candidate motion vectors determined from spatially neighboring blocks in the same frame as the current portion or a candidate motion vector determined from a co-located block in a reference frame. Video encoder 20 may perform motion vector prediction, and if needed, signal syntax elements that allow video decoder 30 to predict the motion vector, rather than signal an original motion vector to reduce bit rate in signaling. The candidate motion vector vectors from the spatially neighboring blocks may be referred to as spatial motion vector predictor (MVP) candidates, whereas the candidate motion vector from the co-located block in another reference frame may be referred to as temporal MVP candidate.

In the HEVC standard, there are two inter prediction modes, named merge (skip is considered as a special case of merge) and advanced motion vector prediction (AMVP) modes, respectively, for a prediction unit (PU). In general, these modes may be referred to as motion vector prediction modes.

In merge mode, video encoder 20 instructs video decoder 30, through bitstream signaling of prediction syntax, to copy a motion vector, reference picture index (identifying a reference frame, in a given reference picture list, to which the motion vector points) and the motion prediction direction (which identifies the reference picture list (List 0 or List 1), i.e., in terms of whether the reference frame temporally precedes or follows the currently frame) from a selected candidate motion vector for a current block of the frame. This is accomplished by signaling in the bitstream an index into a candidate motion vector list identifying the selected candidate motion vector (e.g., the particular spatial MVP candidate or temporal MVP candidate). Thus, for merge mode, the prediction syntax may include a flag identifying the mode (in this case "merge" mode) and an index identifying the selected candidate motion vector. In some instances, the candidate motion vector will be in a causal portion in reference to the current block. That is, the candidate motion vector will have already been decoded by the video decoder 30. As such, video decoder 30 has already received and/or determined the motion vector, reference index, and motion prediction direction for the causal portion. As such, video decoder 30 may simply retrieve the motion vector, reference index, and motion prediction direction associated with the causal portion from memory, and copy these values as the motion information for the current portion. To reconstruct a block in merge mode, video decoder 30 obtains the predictive block using the derived motion information for the current portion, and adds the residual data to the predictive block to reconstruct the coded block.

In AMVP, video encoder 20 instructs video decoder 30, through bitstream signaling, to only copy the motion vector from the candidate portion and use the copied vector as a predictor for motion vector of the current portion, and signals the motion vector difference (MVD). The reference frame and the prediction direction associated with the motion vector of the current portion are signaled separately. An MVD is the difference between the current motion vector for the current block and a motion vector predictor derived from a candidate block. In this case, video encoder 20, using motion estimation, determines an actual motion vector for the block to be coded, and then determines the difference between the actual motion vector and the motion vector predictor as the MVD value. In this way, video decoder 30 does not use an exact copy of the candidate motion vector as the current motion vector, as in the merge mode, but may rather use a candidate motion vector that may be "close" in value to the current motion vector determined from motion estimation and add the MVD to reproduce the current motion vector. To reconstruct a block in AMVP mode, video decoder 30 adds the corresponding residual data to reconstruct the coded block.

In most circumstances, the MVD requires fewer bits to signal than the entire current motion vector. As such, AMVP allows for more precise signaling of the current motion vector while maintaining coding efficiency over sending the whole motion vector. In contrast, the merge mode does not allow for the specification of an MVD, and as such, merge mode sacrifices accuracy of motion vector signaling for increased signaling efficiency (i.e., fewer bits). The prediction syntax for AMVP may include a flag for the mode (in this case AMVP flag), the index for the candidate portion, the MVD between the current motion vector and the predictive motion vector from the candidate portion, the reference index, and the motion prediction direction.

In either AMVP or merge mode, a motion vector (MV) candidate list is maintained for multiple motion vector predictors. The motion vector(s), as well as reference indices in the merge mode, of the current PU are generated by determining one candidate from the MV candidate list.

In one example, the MV candidate list may contain up to 5 candidates for the merge mode and only two candidates for the AMVP mode. MVP candidates for both modes are derived similarly from the same spatial and temporal neighboring blocks. In one example, spatial MV candidates may be derived from the neighboring blocks shown in FIG. 4 for a specific PU (PU0), although the methods generating the candidates from the blocks differ for merge and AMVP modes. That is each motion vector prediction mode may use the same set of candidate blocks, but may use different MVP candidate list derivation techniques to determine the final list of MVP candidates that are used.

Figure 4:
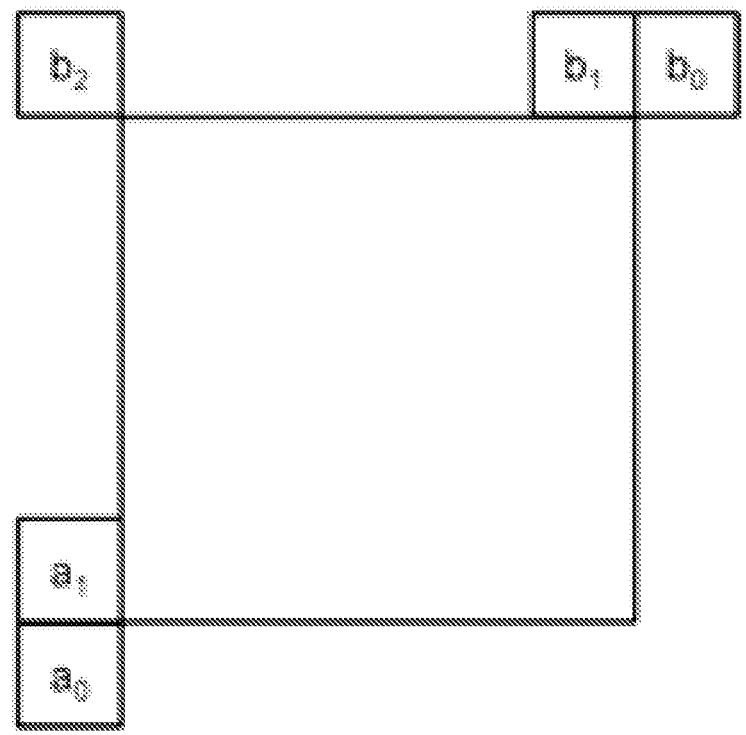
FIG. 4 shows examples of spatial neighboring motion vector candidates for merge and AMVP modes.

In one example for merge mode, the positions of five spatial MV candidates are shown in FIG. 4. For each candidate position, the availability is checked according to the order: {a1, b1, b0, a0, b2}. In some examples, motion information for a particular candidate may be considered unavailable if a particular candidate block does not have any motion information associated with it (e.g., the candidate block was coded using intra prediction). In other examples, candidate blocks may be considered unavailable if they are within the same CU as the currently-coded block.

In one example for AMVP mode, the neighboring blocks are divided into two groups: left group consisting of the block a0 and a1, and above group consisting of the blocks b0, b1, and b2 as shown in FIG. 4. For the left group, the availability is checked according to the order: {a0, a1}. For the above group, the availability is checked according to the order: {b0, b1, b2}. For each group, the potential candidate in a neighboring block referring to the same reference picture as that indicated by the signaled reference index has the highest priority to be chosen to form a final candidate of the group. It is possible that all neighboring blocks don't contain a motion vector pointing to the same reference picture. Therefore, if such a candidate cannot be found, the first available candidate will be scaled to form the final candidate, thus the temporal distance differences can be compensated.

In one example of merge mode, after validating the spatial candidates, two kinds of redundancies may be removed. If the candidate position for the current PU would refer to the first PU within the same CU, the position is excluded, as the same merge could be achieved by a CU without splitting into prediction partitions. Furthermore, any redundant entries where candidates have exactly the same motion information may also be excluded.

After the spatial neighboring candidates are checked, the temporal candidates are validated (e.g., the temporal candidate is checked for available motion information). For the temporal candidate, the right bottom position just outside of the collocated PU of the reference picture is used if it is available. Otherwise, the center position is used instead. The way to choose the collocated PU is similar to that of prior standards, but HEVC allows more flexibility by transmitting an index to specify which reference picture list is used for the collocated reference picture.

One issue related to the use of the temporal candidate is the amount of the memory to store the motion information of the reference picture. This is addressed by restricting the granularity for storing the temporal motion candidates to only the resolution of a 16×16 luma grid, even when smaller PB structures are used at the corresponding location in the reference picture. In addition, a picture parameter set (PPS) flag allows the encoder to disable the use of the temporal candidate, which is useful for applications with error-prone transmission.

In some examples, a maximum number of merge candidates C is specified in a slice header. If the number of merge candidates found (including the temporal candidate) is larger than C, only the first C−1 spatial candidates and the temporal candidate are retained. Otherwise, if the number of merge candidates identified is less than C, additional candidates may be generated until the number is equal to C. This simplifies the parsing and makes it more robust, as the ability to parse the coded data is not dependent on merge candidate availability. Additional MVP candidates, if needed, may be referred to as "default" MVP candidates or "artificial" MVP candidates.

For B slices, additional merge candidates are generated by choosing two existing candidates according to a predefined order for reference picture list 0 and list 1. For example, the first generated candidate uses the first merge candidate for list 0 and the second merge candidate for list 1. HEVC specifies a total of 12 predefined pairs of two in the following order in the already constructed merge candidate list as (0, 1), (1, 0), (0, 2), (2, 0), (1, 2), (2, 1), (0, 3), (3, 0), (1, 3), (3, 1), (2, 3), and (3, 2). Among them, up to five candidates can be included after removing redundant entries.

When the number of merge candidates is still less than C, default merge candidates, including default motion vectors and the corresponding reference indices, are used instead with zero motion vectors associated with reference indices from zero to the number of reference pictures minus one are used to fill any remaining entries in the merge candidate list.

In one example of AMVP mode, HEVC allows a lower number of candidates to be used in the motion vector prediction process case, since video encoder 20 can send a coded difference to change the motion vector. Furthermore, video encoder 20 performs motion estimation, which is one of the most computationally expensive operations in video encoder 20, and complexity is reduced by allowing a small number of candidates.

When the reference index of the neighboring PU is not equal to that of the current PU, a scaled version of the motion vector may be used. The neighboring motion vector is scaled according to the temporal distances between the current picture and the reference pictures indicated by the reference indices of the neighboring PU and the current PU, respectively.

In some examples, when two spatial candidates have the same motion vector components, one redundant spatial candidate may be excluded (e.g., not added to the MVP candidate list). In one example, when the number of motion vector predictors is not equal to two and the use of temporal MV prediction is not explicitly disabled, the temporal MV prediction candidate is included. This means that the temporal candidate is not used at all when two spatial candidates are available.

Finally, the default motion vector, which in this example is a zero motion vector (i.e., a motion vector with a value of zero), is included repeatedly until the number of motion vector prediction candidates is equal to two, which guarantees that the number of motion vector predictors is two. Thus, only a coded flag is necessary to identify which motion vector prediction is used in the case of AMVP mode.

The motion vector is derived for the luma component of a current PU/CU, before it is used for chroma motion compensation. The motion vector may be scaled, based on the chroma sampling format.

In HEVC, an LCU (or "CTB") may be divided into parallel motion estimation regions (MERs) and allow only those neighboring PUs which belong to different MERs from the current PU to be included in the merge/skip MVP list construction process. The size of the MER is signaled in PPS with the syntax element log 2_parallel_merge_level_minus2.

When the MER size is larger than N×N, wherein 2N×2N is the smallest CU size, MER takes effect in a way that a spatial neighboring block, if it is inside the same MER as the current PU, it is considered as unavailable.

The IBC coding mode has been included in some versions of SCC for HEVC. A conceptual diagram showing IBC coding techniques is shown as in FIG. 5, wherein the current block (CU/PU) 102 is predicted from an already decoded predictive block 104 of the current picture/slice. In this example, the prediction signal (e.g., the prediction residual between current block 102 and predictive block 104) is reconstructed but without in-loop filtering, including de-blocking and Sample Adaptive Offset (SAO).

Figure 5:
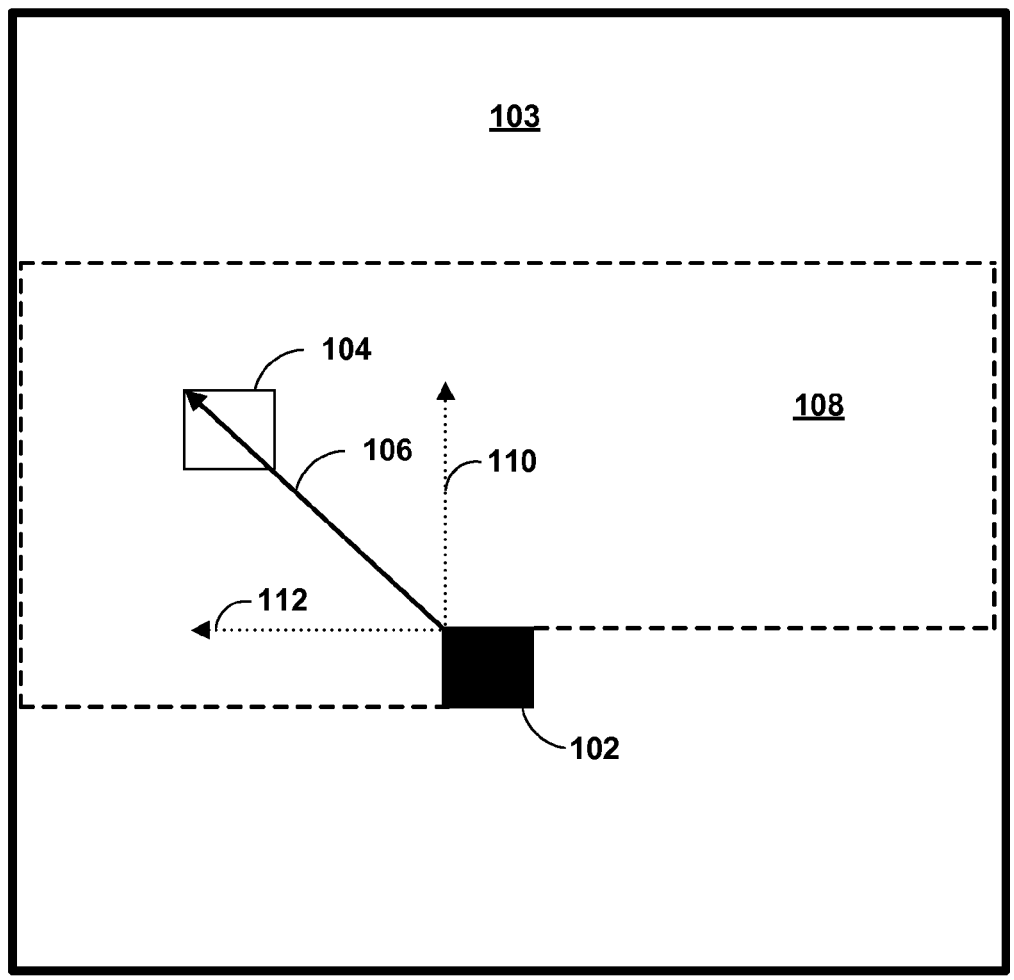
FIG. 5 shows a conceptual illustration of the intra block copy (IBC) mode.

Video encoder 20 and video decoder 30 may be configured to encode and decode blocks of video data using an IBC mode as shown in FIG. 5. Many applications, such as remote desktop, remote gaming, wireless displays, automotive infotainment, cloud computing, etc., are becoming routine in people's daily lives, and the coding efficiency when coding such content may be improved by the use of an IBC mode. System 10 of FIG. 1 may represent devices configured to execute any of these applications. Video contents in these applications are often combinations of natural content, text, artificial graphics, etc. In text and artificial graphics regions of video frames, repeated patterns (such as characters, icons, symbols, etc.) often exist. As introduced above, IBC is a dedicated technique which enables removing this kind of redundancy and potentially improving the intra frame coding efficiency. As illustrated in FIG. 5, for the coding units (CUs) which use IBC, the prediction signals are obtained from the already reconstructed search region 108 in the same frame as current block 102. In the end, the block vector 106, which indicates the position of the predictive block 104 displaced from the current block 102, together with the prediction residual are encoded. Note that the block vector 106 may include a horizontal component 112 and a vertical component 110.

FIG. 5 illustrates an example technique for predicting a current block 102 of video data within a current picture 103 according to a mode for intra prediction of blocks of video data from predictive blocks of video data within the same picture according to this disclosure, e.g., according to an IBC mode in accordance with the techniques of this disclosure. FIG. 5 illustrates a predictive block 104 of video data within current picture 103. A video coder, e.g., video encoder 20 and/or video decoder 30, may use predictive video block 104 to predict current video block 102 according to an IBC in accordance with the techniques of this disclosure.

Video encoder 20 selects predictive video block 104 for predicting current video block 102 from a set of previously-reconstructed blocks of video data. Video encoder 20 reconstructs blocks of video data by inverse quantizing and inverse transforming the video data that is also included in the encoded video bitstream, and summing the resulting residual blocks with the predictive blocks used to predict the reconstructed blocks of video data. In the example of FIG. 5, search region 108 within picture 103, which may also be referred to as an "intended area" or "raster area," includes the set of previously reconstructed video blocks. Video encoder 20 may define search region 108 within picture 103 in variety of ways, as described in greater detail below. Video encoder 20 may select predictive block 104 to predict current block 102 from among the video blocks in search region 108 based on an analysis of the relative efficiency and accuracy of predicting and coding current block 102 based on various video blocks within search region 108.

Search region 108 includes already-coded blocks from the same picture 103 as the current block 102. Assuming, for example, the frame is being coded in a raster scan order (i.e., left-to-right and top-to-bottom), the already-coded blocks of the frame correspond to blocks that are to the left of and above the current block 102, as shown in FIG. 5. In some examples, search region 108 may include all of the already-coded blocks in the frame, while in other examples, the search region may include fewer than all of the already-coded blocks.

Video encoder 20 determines block vector 106 representing the location or displacement of predictive block 104 relative to current block 102. Block vector 106 includes horizontal displacement component 112 and vertical displacement component 110, which respectively represent the horizontal and vertical displacement of predictive block 104 relative to current block 102. In one example, the block vector in FIG. 5 identifies the differences between a top-left pixel of the current block 102 and a top-left pixel of the predictive block 104. Thus, by signaling the block vector in the encoded video bitstream, video decoder 30 can identify predictive block 104 for the current 102, when current block 102 is coded in an IBC mode. Video encoder 20 may include one or more syntax elements that identify or define block vector 106, e.g., that define horizontal displacement component 112 and vertical displacement component 110, in the encoded video bitstream. Video decoder 30 may decode the one or more syntax elements to determine block vector 106, and use the determined vector to identify predictive block 104 for current video block 102. As will be discussed in more detail below, in examples of this disclosure, video encoder 20 and video decoder 30 may use motion vector prediction techniques, such as those used to code a motion vector for inter prediction, to predict block vectors for IBC mode (e.g., to predict block vectors for current blocks of video data predicted from another block of video data in the same frame as the current block).

In some examples, the resolution of block vector 106 can be integer pixel, e.g., be constrained to have integer pixel resolution. In such examples, the resolution of horizontal displacement component 112 and vertical displacement component 110 will be integer pixel resolution. In such examples, video encoder 20 and video decoder 30 need not interpolate pixel values of predictive video block 104 to determine the predictor for current video block 102.

In other examples, the resolution of one or both of horizontal displacement component 112 and vertical displacement component 110 can be sub-pixel resolution. For example, one of components 112 and 110 may have integer pixel resolution, while the other has sub-pixel resolution. In some examples, the resolution of both of horizontal displacement component 112 and vertical displacement component 110 can be sub-pixel, but horizontal displacement component 112 and vertical displacement component 110 may have different resolutions.

In some examples, a video coder, e.g., video encoder 20 and/or video decoder 30, adapts the resolution of horizontal displacement component 112 and vertical displacement component 110 based on a specific level, e.g., block-level, slice-level, or picture-level adaptation. For example, video encoder 20 may signal a flag at the slice level, e.g., in a slice header, that indicates whether the resolution of horizontal displacement component 112 and vertical displacement component 110 is integer pixel resolution or is not integer pixel resolution. If the flag indicates that the resolution of horizontal displacement component 112 and vertical displacement component 110 is not integer pixel resolution, video decoder 30 may infer that the resolution is sub-pixel resolution. In some examples, one or more syntax elements, which are not necessarily a flag, may be transmitted for each slice or other unit of video data to indicate the collective or individual resolutions of horizontal displacement components 112 and/or vertical displacement components 110.

In still other examples, instead of a flag or a syntax element, video encoder 20 may set based on, and video decoder 30 may infer the resolution of horizontal displacement component 112 and/or vertical displacement component 110 from resolution context information. Resolution context information may include, as examples, the color space (e.g., YUV, RGB, or the like), the specific color format (e.g., 4:4:4, 4:2:2, 4:2:0, or the like), the frame size, the frame rate, or the quantization parameter (QP) for the picture or sequence of pictures that include current video block 102. In at least some examples, a video coder may determine the resolution of horizontal displacement component 112 and/or vertical displacement component 110 based on information related to previously coded frames or pictures. In this manner, the resolution of horizontal displacement component 112 and the resolution for vertical displacement component 110 may be pre-defined, signaled, may be inferred from other, side information (e.g., resolution context information), or may be based on already coded frames.

Current block 102 may be a CU, or a PU of a CU. In some examples, a video coder, e.g., video encoder 20 and/or video decoder 30, may split a CU that is predicted according to IBC into a number of PUs. In such examples, the video coder may determine a respective (e.g., different) two-dimensional vector 106 for each of the PUs of the CU. For example, a video coder may split a 2N×2N CU into two 2N×N PUs, two N×2N PUs, or four N×N PUs. As other examples, a video coder may split a 2N×2N CU into ((N/2)×N+(3N/2)×N) PUs, ((3N/2)×N+(N/2)×N) PUs, (N×(N/2)+N×(3N/2)) PUs, (N×(3N/2)+N×(N/2)) PUs, four (N/2)×2N PUs, or four 2N×(N/2) PUs. In some examples, video coder may predict a 2N×2N CU using a 2N×2N PU.

Current block 102 may include a luma video block (e.g., luma component) and a chroma video block (e.g., chroma component) corresponding to the luma video block. In some examples, video encoder 20 may only encode one or more syntax elements defining block vector 106 for luma video blocks into the encoded video bitstream. In such examples, video decoder 30 may derive block vector 106 for each of one or more chroma blocks corresponding to a luma block based on the two-dimensional vector signaled for the luma block. In the techniques described in this disclosure, in the derivation of the two-dimensional vectors for the one or more chroma blocks, video decoder 30 may modify the two-dimensional vector for the luma block if the two-dimensional vector for the luma block points to a sub-pixel position within the chroma sample.

Depending on the color format, e.g., color sampling format or chroma sampling format, a video coder may downsample corresponding chroma video blocks relative to the luma video block. Color format 4:4:4 does not include downsampling, meaning that the chroma blocks include the same number of samples in the horizontal and vertical directions as the luma block. Color format 4:2:2 is downsampled in the horizontal direction, meaning that there are half as many samples in the horizontal direction in the chroma blocks relative to the luma block. Color format 4:2:0 is downsampled in the horizontal and vertical directions, meaning that there are half as many samples in the horizontal and vertical directions in the chroma blocks relative to the luma block.

In examples in which video encoder 20 and/or video decoder 30 determine block vectors 106 for chroma video blocks based on block vectors 106 for corresponding luma blocks, video encoder 20 and/or video decoder 30 may to modify the luma vector. For example, if a luma block vector 106 has integer resolution with horizontal displacement component 112 and/or vertical displacement component 110 being an odd number of pixels, and the color format is 4:2:2 or 4:2:0, the converted luma vector may not point an integer pixel location in the corresponding chroma block. In such examples, video encoder 20 and/or video decoder 30 may scale the luma vector for use as a chroma vector to predict a corresponding chroma block.

Block compensation will now be discussed. For the luma component or the chroma components that are coded with IBC, video encoder 20 and/video decoder 30 performs block compensation using integer block compensation, therefore no interpolation is needed. In this example, block vector 106 is predicted and signalled at the integer level.

In some proposals for SCC, block vector 106 is not signaled in its entirety, but is predicted from a block vector predictor. In one example, the block vector predictor is set to (−w, 0) at the beginning of each CTB, where w is the width of the CU (e.g., current block 102). Such a block vector predictor is updated to be the one of the latest coded CU/PU if that is coded with IBC mode.

If a CU/PU is not coded with Intra BC, the block vector predictor remains unchanged. After block vector prediction, the block vector difference is encoded using the MV difference (MVD) coding method in HEVC, described above.

IBC block size will now be discussed. In some examples, IBC is enabled at both CU and PU level. For PU level IBC coding, 2N×N and N×2N PU partition is supported for all the CU sizes. In addition, when the CU is the smallest CU, N×N PU partition is supported.

As discussed above, in the examples of this disclosure, inter prediction mode and IBC mode are unified. That is, both motion estimation unit 42 and motion compensation unit 44 of video encoder 20 may be configured to encode video blocks in both inter prediction mode and IBC mode. In one example, such unification may be accomplished by including the reference frame index of the current frame in the reference picture list used by motion estimation unit 42 and motion compensation unit 44. Likewise, motion compensation unit 82 of video decoder 30 may also be configured to decode video blocks in both inter prediction mode and IBC mode by including the reference frame index of the current frame in the reference picture list used motion compensation unit 82. Co-pending U.S. Provisional Application No. 62/000,437, filed May 19, 2014 details some techniques for the unification of inter prediction mode and IBC modes.

In B. Li, et al. "Non-SCCE1: Unification of intra BC and inter modes," Joint Collaborative Team on Video Coding (JCT-VC) of ITU-T SG 16 WP 3 and ISO/IEC JTC1/SC 29/WG 11, 18$^{th}$ Meeting: Sapporo, J P, 30 June-9 Jul. 2014 (JCTVC-R0100), the unification of Intra BC and Inter was proposed. As discussed above, the current picture is added into the reference list. The current picture may be marked as a long-term before the decoding, and marked as a short-term reference picture after the decoding of current picture. When IBC mode is enabled, the syntax parsing process and decoding process of P slice is followed for I slices (e.g., slices including IBC coded blocks).

For inter prediction and IBC mode unification, although the signaled prediction modes can be the same (e.g., both using MODE_INTER), video decoder 30 may be able to differentiate blocks coded using the IBC mode from the conventional inter predicted blocks by checking whether the reference picture identified by the reference index associated with the current block is the current picture (e.g., the reference picture identified by the reference picture index has the same POC value as the current picture). If the reference picture and the current picture are the same pictures, video decoder 30 may determine that the block is coded using IBC mode. Otherwise, the block is a conventional inter predicted block (e.g., predicted from a block in another picture relative to the current block).

While the above-mentioned techniques for the unification of inter prediction and IBC mode address pixel prediction techniques, existing IBC techniques may have some shortcomings regarding motion vector and block vector prediction. This disclosure describes techniques for motion vector and block vector prediction for coding inter prediction mode coded and IBC mode coded blocks.

In one example of the disclosure, when pixels prediction techniques for IBC mode and inter prediction mode are unified as described above, video encoder 20 and video decoder 30 may be further configured to use the same motion vector prediction candidates for inter predicted blocks as for performing block vector prediction for IBC coded blocks. That is, rather than using the block vector prediction techniques outlined above, video encoder 20 and video decoder 30 may be configured to use inter merge and inter AMVP techniques using the candidate blocks shown in FIG. 4. For example, video encoder 20 and/or video decoder 30 may use the inter merge process to predict block vectors for blocks coded using IBC mode.

In one example of the disclosure, the entirety of the merge and AMVP processes for inter predicted blocks, including rules for MVP candidate list derivation, are also employed for IBC coded blocks. In other examples, video encoder 20 and/or video decoder 30 may use the same candidate lists for merge and AMVP modes of motion vector prediction for IBC coded blocks (e.g., to predict the block vector), but the rules for MVP candidate list derivation may have some differences.

As one example, in the case that a block is coded using IBC mode (e.g., as identified by the reference picture index), video encoder 20 and/or video decoder 30 may be configured to use inter prediction merge techniques for all IBC blocks having a size greater than 4×4. For IBC blocks having a size of 4×4 or smaller, video encoder 20 and/or video decoder 30 are configured to disable any merge motion vector prediction process for such IBC blocks.

In another example of the disclosure, the MVP candidates that are considered available for use in merge or AMVP may be altered depending on whether the currently-coded blocks was encoded using inter prediction or IBC mode. In one example of the disclosure, all possible MVP candidates, such as those shown in FIG. 4, are added to the MVP candidate list, regardless of whether they are IBC coded blocks or are inter prediction coded blocks. For example, the MVP candidates for an IBC block may include both inter predicted blocks and IBC coded blocks. Likewise, the MVP candidates for an inter predicted block may include both inter predicted blocks and IBC coded blocks. Such a technique may enable video encoder 20 and/or video decoder 30 to avoid additional conditional checking during a candidate list derivation process for merge and/or AMVP mode.

In another example of the disclosure, the type of candidate blocks that may be added to the MVP candidate list may be restricted in some fashion. For example, for a block coded using inter prediction, video encoder 20 and/or video decoder 30 may be configured to only add up to X number of MVP candidates to the MVP candidate list that are from IBC coded blocks. While the block vector of an IBC coded block may be in the same format as a motion vector for an inter predicted block, the nature of the information conveyed by a motion vector and a block vector are different. A motion vector is indicative of the movement of an object in a video frame from one frame to another, while a block vector merely indicates another frame in the same block having similar information the current block. Including too many IBC coded blocks in the MVP candidate list for an inter predicted block may lead to poor bit-rate efficiency when prediction a motion vector.

As such, video encoder 20 and/or video decoder 30 may be configured to limit the number of IBC coded blocks that may be included in the MVP candidate list for an inter predicted block. In some examples, video encoder 20 and/or video decoder 30 may be configured to mark all MVP candidate from an IBC block as unavailable. Unavailable MVP candidates may be replaced with default candidates as described above, or in accordance with the techniques of the disclosure described below.

Likewise, in another example of the disclosure, for a block coded using IBC mode, video encoder 20 and/or video decoder 30 may be configured to only add up to X number of MVP candidates to the MVP candidate list that are from inter prediction coded blocks. In some examples, video encoder 20 and/or video decoder 30 may be configured to mark all MVP candidate from an inter predicted block as unavailable. Unavailable MVP candidates may be replaced with default candidates as described above, or in accordance with the techniques of the disclosure described below.

In other examples of the disclosure, video encoder 20 and/or video decoder 30 may use the same merge candidates (e.g., such as shown in FIG. 4) to derive a merge candidate list. However, the default or additional merge candidates that are added to the MVP candidate list may be different for inter prediction block and IBC coded blocks. In previous proposals for AMVP and merge mode in HEVC v1, the default motion vectors (which are zero motion vectors) are added to the MVP candidate list to make ensure there are 2 predictor candidates for AMVP mode and a minimum number (e.g., 5) MVP candidates for merge mode. However, the zero motion vectors are not valid for an IBC coded block. This is because and IBC coded block is coded relative to another block in the same picture. A zero motion vector would thus point to the currently-coded block. A block may not be predicted from itself. Thus, in accordance with the techniques of this disclosure, video encoder 20 and/or video decoder 30 may be configured to determine other default motion vectors which are valid for IBC coded blocks for AMVP mode and merge mode.

When video encoder 20 and/or video decoder 30 determine that a block is coded using IBC mode, techniques for AMVP and MVP candidate list construction are proposed in this disclosure to more efficiently code the motion vectors. More specifically the following example techniques are proposed. Each of the example techniques may be separately or jointly applied with one or more of the others.

In one example of the disclosure, instead of using zero candidates for default motion vector candidates for IBC coded blocks, video encoder 20 and/or video decoder 30 may be configured to select a default motion vector candidate for IBC coded blocks from a predetermined list of default candidates which may include only valid IBC candidates, and that, for example, do not include a zero motion vector.

In another example, the set of default candidates for an IBC coded block may include one or more of (−2w, 0), (2w, 0), (−w, 0), (w, 0), (0,0) (0, −h), (0, −2h), (0, h), (0, 2h), (−8, 0), (0, 8), (−w, −h), (−2w, −h), (−w, −2h), (−2w, −2h), where w and h are the width and height of current CU, PU or CTB. In other examples, the predefined set above does not include the zero motion vector (0, 0). In some examples, the values of these predefined default motion vectors may correspond to integer-pixel precision, and video encoder 20 and/or video decoder 30 may scale the values of the predefined motion vectors up or down by video encoder 20 and/or video decoder 30 depending on the precision used for motion vectors. For example, in case that video encoder 20 and video decoder 30 are configured to code the motion vector with quarter-pixel precision, then video encoder 20 and/or video decoder 30 may be configured to scale the motion vector (−2w, 0) in the predefined set to (−8w, 0) before the use.

In another example of the disclosure, video encoder 20 and/or video decoder 30 may be configured to use a predefined set of motion vectors as the default motion vector, wherein the predefined set of motion vectors includes, in the decoding order (e.g., the latest coded blocks), motion vectors of the same CTB as the currently coded block. In one example, the previously-decoded motion vectors added to the predefined set of motion vectors may only include those motion vectors from IBC coded blocks. In another example, the previously-decoded motion vectors added to the predefined set of motion vectors may only include those motion vectors from conventional inter coded blocks. In another example, the previously-decoded motion vectors added to the predefined set of motion vectors may include motion vectors from both IBC coded blocks and conventional inter coded blocks.

In another example of the disclosure, when IBC is enabled, except for the default motion vector selection for unavailable MVP candidates, video encoder 20 and/or video decoder 30 may be configured to apply the same AMVP motion vector prediction process as in HEVCv1 to both IBC coded blocks and inter predicted blocks. In one example, video encoder 20 and/or video decoder 30 may be configured to not use zero motion vectors as the default motion vectors IBC and inter coded blocks. Instead, video encoder 20 and/or video decoder 30 may be configured to determine a default motion vector from a predetermined set of default motion vectors, such as those defined above. In another example, video encoder 20 and/or video decoder 30 may be configured to determine a default motion vector from a predetermined set of default motion vectors that does include a zero motion vector.

In another example of the disclosure, when IBC is enabled, except for the default motion vector selection for unavailable MVP candidates, video encoder 20 and/or video decoder 30 may be configured to apply the same merge motion vector prediction process as in HEVCv1 to both IBC coded blocks and inter predicted blocks. In one example, video encoder 20 and/or video decoder 30 may be configured to use the same merge candidate list for IBC coded blocks inter prediction coded blocks. For the candidate list construction for merge, the default motion vectors used for IBC and inter prediction coded blocks may not be zero motion vectors as in HEVCv1, but may be selected from the predefined sets, as described above. When selecting the default motion vectors in this manner, video encoder 20 and/or video decoder 30 may be configured to use the reference index of the current frame for IBC coded blocks.

In another example, IBC coded blocks and inter prediction coded blocks share the same merge candidate list. For the default merge candidates, the reference indices generation process is the same as that in HEVC v1. However, when the reference picture indexed by the reference index is the current picture, the corresponding default motion vector may not be a zero motion vector, but instead, video encoder 20 and/or video decoder 30 may be configured to determine the default motion vectors from the predefined sets described above.

Any of the techniques discussed above may be used for specific reference lists, e.g., only for reference list 0, or only for reference list 1, or for both reference list 0 and reference list 1. Also, the use of techniques described above may depend on whether the current picture is added in the reference picture list. That is, the techniques above for not using zero motion vectors for IBC coded blocks may be limited to reference picture lists that allow for IBC coding (e.g., the reference picture lists that include the current picture).

In other examples of the disclosure, video encoder 20 and/or video decoder 30 may be configured to determine IBC merge candidates other than the default candidates mentioned above. The following techniques may apply if the whole reference block is not available when the motion vector of the IBC merge candidates are used for the current block in the merge process (e.g., the reference block is not reconstructed, the reference block is not padded, the reference block is in a different slice/tile, etc.). In one example, the IBC merge candidate will not be added to the merge candidate list.

In another example, IBC merge candidates are added to the candidate list, but before they are used in the merge process, video encoder 20 and/or video decoder 30 may be configured to alter the IBC merge candidates in one of the following ways. In one example, video encoder 20 and/or video decoder 30 may be configured to replace the corresponding motion vectors by the motion vectors in the predefined sets, as is described above. For example, let the luma location (CUx, CUy) specify the top-left sample of the current luma coding block relative to the top-left luma sample of the current picture; (PUx, PUy) specifies the top-left sample of the current luma prediction block relative to the top-left luma sample of the current picture; (MVx, MVy) specifies the corresponding motion vector for one IBC merge candidate to be changed; (PUw, PUh) specifies the width and height of current CU. If PUx+MVx+PUw>CUx, MVy is changed to min(MVy, CUy−PUy−PUh).

In another example, let the luma location (CUx, CUy) specify the top-left sample of the current luma coding block relative to the top-left luma sample of the current picture; (PUx, PUy) specifies the top-left sample of the current luma prediction block relative to the top-left luma sample of the current picture; (MVx, MVy) specifies the corresponding motion vector for one IBC merge candidate to be changed; (PUw, PUh) specifies the width and height of current CU. If PUy+MVy+PUh>CUy, MVx is changed to min(MVx, CUx−PUx−PUw).

In another example of the disclosure, when a temporal MVP (TMVP) is used, the co-located MV may be used in constructing the candidate list for AMVP and merge mode for both IBC coded blocks and inter prediction coded blocks. However, with HEVC merge mode, when the current picture is marked as a long-term term reference picture, and when the co-located block is an IBC block, problems may arise. For example, if the first reference picture (e.g., reference index equals to 0) in the reference list is not a long-term picture, then the MV associated with co-located IBC block will not be added to the candidate list for merge mode. According to examples of the disclosure, the following techniques may be employed for candidate list construction.

In one example, when both IBC mode and TMVP are enabled, for the merge process, if the co-located block is an IBC block, video encoder 20 and/or video decoder 30 may consider the co-located IBC block as available without checking whether the first reference picture in each reference picture list is a long-term reference picture or a short-tem reference picture. Video encoder 20 and/or video decoder 30 may be configured to add the MV associated with the co-located IBC block to the candidate list. Video encoder 20 and/or video decoder 30 may be configured to derive the co-located block in the same manner as the co-located block derivation techniques in HEVC. That is, first, check the bottom-right block; if not available, then check the center block.

In another example, video encoder 20 and/or video decoder 30 may be configured to add both MVs (e.g., block vectors) of the bottom-right block and the center block to the candidate list, as long as both the bottom-right block and the center block are IBC blocks, without checking whether the first reference picture in each list is a long-term reference picture or a short-tem reference picture. By adding the MV (e.g., block vector) to the merge candidate list in this manner, the corresponding reference index for the current block is set to be the reference index that corresponds to the current picture.

In another example, when both IBC mode and TMVP are enabled, for the AMVP process, if the co-located block is an IBC block, video encoder 20 and/or video decoder 30 may consider the co-located IBC block as available without checking whether the reference pictures of the current block are long-term reference pictures or short-tem reference pictures. Video encoder 20 and/or video decoder 30 may be configured to add the MV associated with the co-located IBC block to the candidate list. Video encoder 20 and/or video decoder 30 may be configured to derive the co-located block in the same manner as the co-located block derivation techniques in HEVC. That is, first, check the bottom-right block; if not available, then check the center block.

In another example, video encoder 20 and/or video decoder 30 may be configured to add both MVs (e.g., block vectors) of the bottom-right block and the center block to the candidate list, as long as both the bottom-right block and the center block are IBC blocks, without checking whether the first reference picture in each list is a long-term reference picture or a short-tem reference picture.

In the examples above, it is possible that the MVs (e.g., block vectors) are not added to the candidate list in the case that a particular MV (e.g., block vector) is not valid for a current block when treating the current MV (e.g., block vector) as an IBC block.

Figure 6:
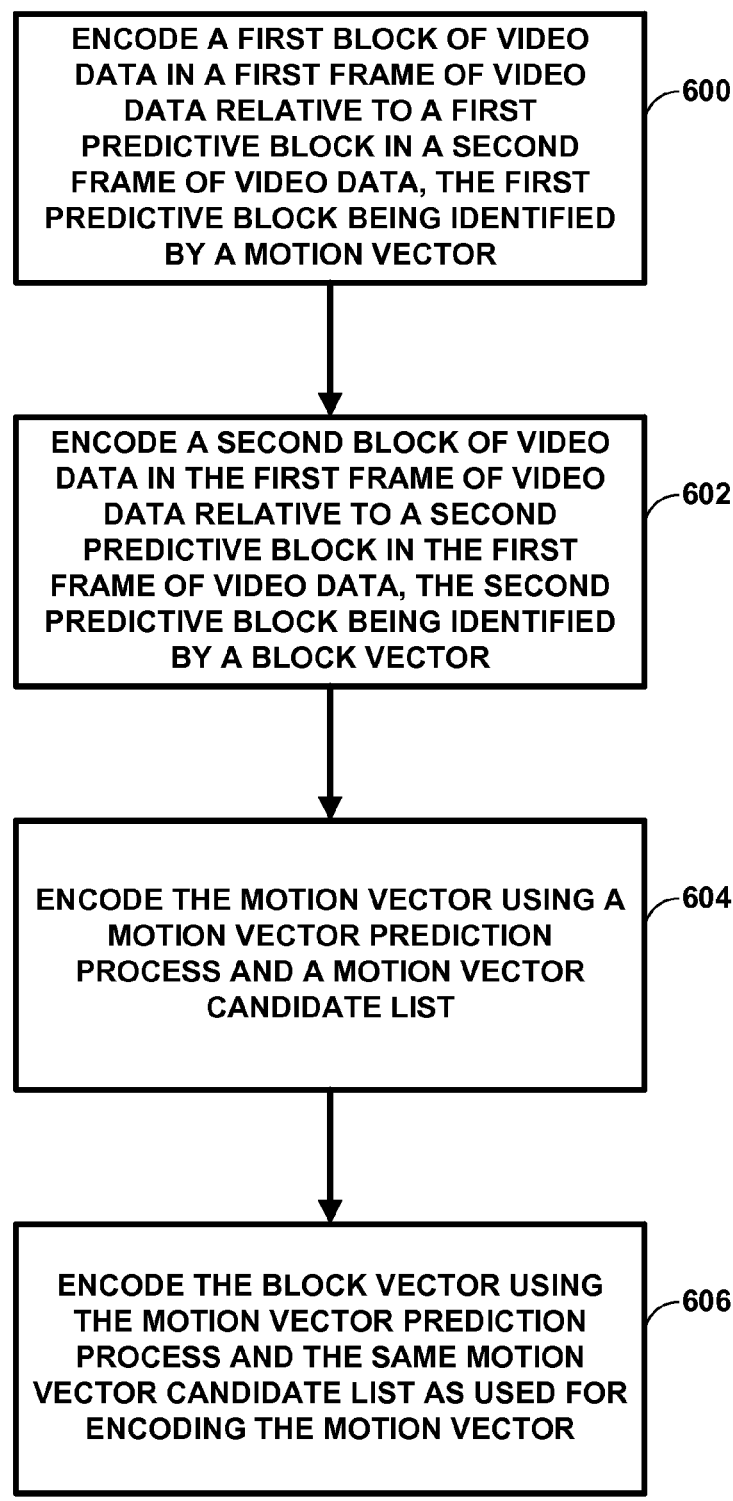
FIG. 6 is a flowchart showing an example video encoding method according to the techniques of this disclosure.

FIG. 6 is a flowchart showing an example video encoding method according to the techniques of this disclosure. The techniques of FIG. 6 may be implemented by one or more structures of video encoder 20, including motion compensation unit 44 and motion estimation unit 42. It should be understood that each of the examples described below may be performed together or may be performed separately.

As shown in FIG. 6, in one example of the disclosure, video encoder 20 may be configured to encode a first block of video data in a first frame of video data relative to a first predictive block in a second frame of video data (600). The first predictive block may be identified by a motion vector. Video encoder 20 may be further configured to encode a second block of video data in the first frame of video data relative to a second predictive block in the first frame of video data (602). The second predictive block may be identified by a block vector. Video encoder 20 may be further configured to encode the motion vector using a motion vector prediction process and a motion vector candidate list (604), and encode the block vector using the motion vector prediction process and the same motion vector candidate list as used for encoding the motion vector (606).

It should be understood that the techniques of this disclosure may also be used in situations where no inter-predicted blocks are encoded in the same frame that contains IBC coded blocks. For example, video encoder 20 may be configured to encode a first block of video data in a first frame of video data, the first block of video data being encoded relative to a first predictive block in the first frame of video data, the first predictive block being identified by a block vector, and encode the block vector using a motion vector prediction process and a same motion vector candidate list as used for decoding a motion vector, wherein the motion vector is used to identify an inter-frame predictive block for a second block of video data coded using inter coding.

In one example of the disclosure, the motion vector prediction process is one of a merge mode and an advanced motion vector prediction (AMVP) mode. In another example of the disclosure, the second block of video data is 4×4 or smaller.

In another example of the disclosure, in order to encode the block vector, video encoder 20 may be further configured to add at least one of a candidate block vector and a candidate motion vector from one or more neighboring blocks in the motion vector candidate list to a motion vector predictor candidate list for the motion vector prediction process.

In another example of the disclosure, video encoder 20 may be further configured to determine that a respective candidate block vector or a respective candidate motion vector is unavailable, and add a default motion vector to the motion vector candidate list. In another example of the disclosure, video encoder 20 may be further configured to determine the default motion vector from a predetermined set of default motion vectors, the predetermined set not including a zero vector (0, 0).

In another example of the disclosure, to encode the motion vector, video encoder 20 may be further configured to add at least one of a candidate block vector and a candidate motion vector from one or more neighboring blocks in the motion vector candidate list to a motion vector predictor candidate list for the motion vector prediction process.

In another example of the disclosure, in order to encode the block vector, video encoder 20 may be further configured to add only candidate block vectors from neighboring blocks in the motion vector candidate list to a motion vector predictor candidate list for the motion vector prediction process. In another example of the disclosure, in order to encode the block vector, video encoder 20 may be further configured to add only candidate block vectors from neighboring blocks in the motion vector candidate list to a motion vector predictor candidate list for the motion vector prediction process.

Figure 7:
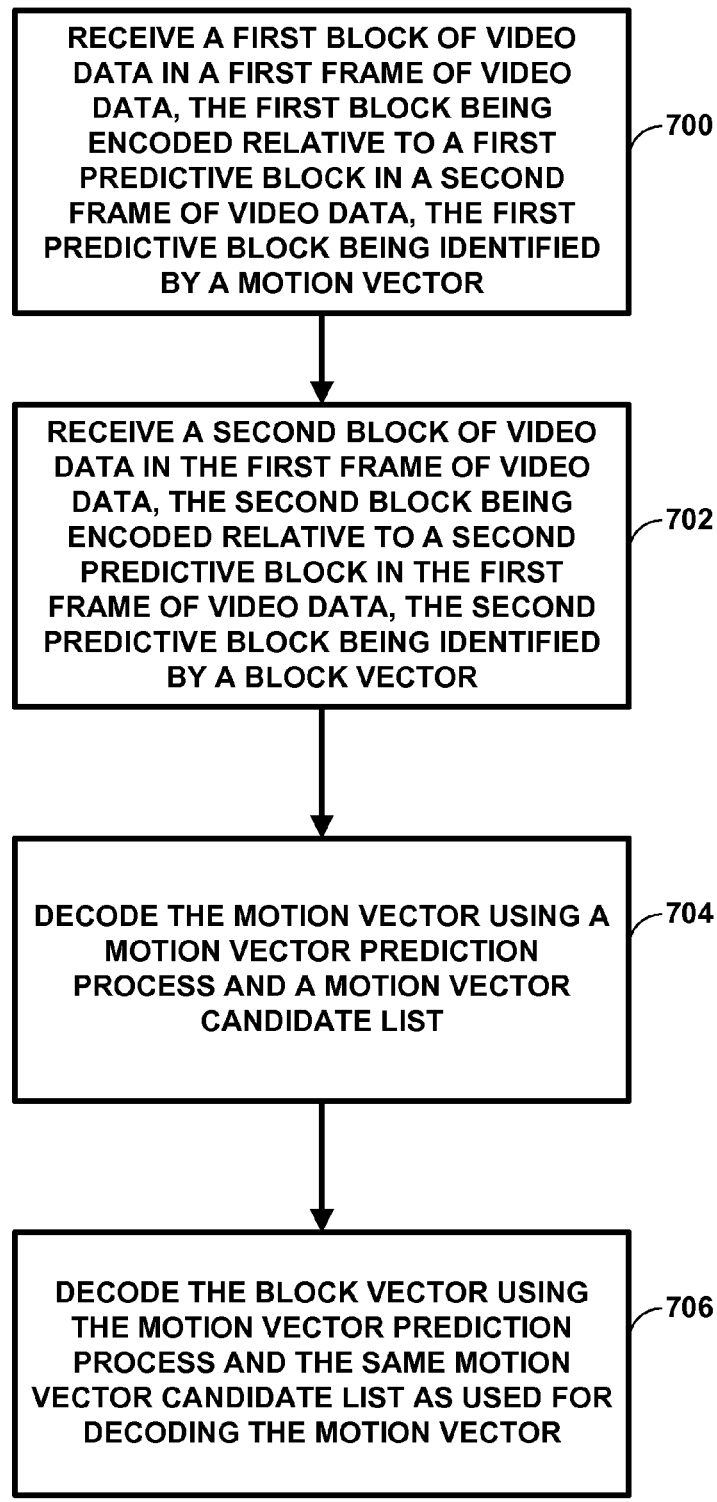
FIG. 7 is a flowchart showing an example video decoding method according to the techniques of this disclosure.

FIG. 7 is a flowchart showing an example video decoding method according to the techniques of this disclosure. The techniques of FIG. 7 may be implemented by one or more structures of video decoder 30, including motion compensation unit 82. It should be understood that each of the examples described below may be performed together or may be performed separately.

As shown in FIG. 7, in one example of the disclosure, video decoder 30 may be configured to receive a first block of video data in a first frame of video data, the first block of video data being encoded relative to a first predictive block in a second frame of video data, and the first predictive block being identified by a motion vector (700). Video decoder 30 may be further configured to receive a second block of video data in the first frame of video data, the second block of video data being encoded relative to a second predictive block in the first frame of video data, and the second predictive block being identified by a block vector (702). Video decoder 30 may be further configured to decode the motion vector using a motion vector prediction process and a motion vector candidate list (704), and decode the block vector using the motion vector prediction process and the same motion vector candidate list as used for decoding the motion vector (706). Video decoder 30 may be further configured to decode the first block of video data using the first predictive block and the motion vector, and decode the second block of video data using the second predictive block and the offset vector.

It should be understood that the techniques of this disclosure may also be used in situations where no inter-predicted blocks are received in the same frame that contains IBC coded blocks. For example, video decoder 30 may be configured to receive a first block of video data in a first frame of video data, the first block of video data being encoded relative to a first predictive block in the first frame of video data, the first predictive block being identified by a block vector, and decode the block vector using a motion vector prediction process and a same motion vector candidate list as used for decoding a motion vector, wherein the motion vector is used to identify an inter-frame predictive block for a second block of video data coded using inter coding.

In one example of the disclosure, the motion vector prediction process is one of a merge mode and an advanced motion vector prediction (AMVP) mode. In another example of the disclosure, the second block of video data is 4×4 or smaller.

In another example of the disclosure, in order to decode the block vector, video decoder 30 may be further configured to add at least one of a candidate block vector and a candidate motion vector from one or more neighboring blocks in the motion vector candidate list to a motion vector predictor candidate list for the motion vector prediction process.

In another example of the disclosure, video decoder 30 may be further configured to determine that a respective candidate block vector or a respective candidate motion vector is unavailable, and add a default motion vector to the motion vector candidate list. In another example of the disclosure video decoder 30 may be further configured to determine the default motion vector from a predetermined set of default motion vectors, the predetermined set not including a zero vector (0, 0).

In another example of the disclosure, in order to decode the motion vector, video decoder 30 may be further configured to add at least one of a candidate block vector and a candidate motion vector from one or more neighboring blocks in the motion vector candidate list to a motion vector predictor candidate list for the motion vector prediction process.

In another example of the disclosure, in order to decode the block vector, video decoder 30 may be further configured to add only candidate block vectors from neighboring blocks in the motion vector candidate list to a motion vector predictor candidate list for the motion vector prediction process. In another example of the disclosure, in order to decode the block vector, video decoder 30 may be further configured to add only candidate block vectors from neighboring blocks in the motion vector candidate list to a motion vector predictor candidate list for the motion vector prediction process.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a first block of video data in a first frame of video data, the first block of video data being encoded relative to a first predictive block in the first frame of video data, the first predictive block being identified by a block vector; and
   decoding the block vector using a motion vector prediction process and a same motion vector candidate list as used for decoding a motion vector, wherein the motion vector is used to identify an inter-frame predictive block for a second block of video data coded using inter coding.

2. The method of claim 1, wherein the motion vector prediction process is one of a merge mode and an advanced motion vector prediction (AMVP) mode.

3. The method of claim 1, further comprising:
receiving the second block of video data; and
decoding the motion vector using the motion vector prediction process and the motion vector candidate list.

4. The method of claim 3, further comprising:
decoding the first block of video data using the first predictive block and the block vector; and
decoding the second block of video data using the inter-frame predictive block and the motion vector.

5. The method of claim 3, wherein decoding the motion vector further comprises:
adding at least one of a candidate block vector and a candidate motion vector from one or more neighboring blocks in the motion vector candidate list to a motion vector predictor candidate list for the motion vector prediction process.

6. The method of claim 1, wherein decoding the block vector further comprises:
adding at least one of a candidate block vector and a candidate motion vector from one or more neighboring blocks in the motion vector candidate list to a motion vector predictor candidate list for the motion vector prediction process.

7. The method of claim 6, further comprising:
determining that a respective candidate block vector or a respective candidate motion vector is unavailable; and
adding a default motion vector to the motion vector candidate list.

8. The method of claim 7, further comprising:
determining the default motion vector from a predetermined set of default motion vectors, the predetermined set not including a zero vector (0, 0).

9. The method of claim 1, wherein decoding the block vector further comprises:
adding only candidate block vectors from neighboring blocks in the motion vector candidate list to a motion vector predictor candidate list for the motion vector prediction process.

10. An apparatus configured to decode video data, the apparatus comprising:
a memory configured to store video data; and
a video decoder configured to:
receive a first block of video data in a first frame of video data, the first block of video data being encoded relative to a first predictive block in the first frame of video data, the first predictive block being identified by a block vector; and
decode the block vector using a motion vector prediction process and a same motion vector candidate list as used for decoding a motion vector, wherein the motion vector is used to identify an inter-frame predictive block for a second block of video data coded using inter coding.

11. The apparatus of claim 10, wherein the video decoder is further configured to:
receive the second block of video data; and
decode the motion vector using the motion vector prediction process and the motion vector candidate list.

12. The apparatus of claim 11, wherein the video decoder is further configured to:
decode the first block of video data using the first predictive block and the block vector; and
decode the second block of video data using the inter-frame predictive block and the motion vector.

13. The apparatus of claim 11, wherein to decode the motion vector further, the video decoder is further configured to:
add at least one of a candidate block vector and a candidate motion vector from one or more neighboring blocks in the motion vector candidate list to a motion vector predictor candidate list for the motion vector prediction process.

14. The apparatus of claim 10, wherein to decode the block vector, the video decoder is further configured to:
add at least one of a candidate block vector and a candidate motion vector from one or more neighboring blocks in the motion vector candidate list to a motion vector predictor candidate list for the motion vector prediction process.

15. The apparatus of claim 14, wherein the video decoder is further configured to:
determine that a respective candidate block vector or a respective candidate motion vector is unavailable; and
add a default motion vector to the motion vector candidate list.

16. The apparatus of claim 15, wherein the video decoder is further configured to:
determine the default motion vector from a predetermined set of default motion vectors, the predetermined set not including a zero vector (0, 0).

17. The apparatus of claim 10, wherein to decode the block vector, the video decoder is further configured to:
add only candidate block vectors from neighboring blocks in the motion vector candidate list to a motion vector predictor candidate list for the motion vector prediction process.

18. The apparatus of claim 10, further comprising a display device in communication with the video decoder, wherein the video decoder is further configured to decode the video data, and wherein the display device is configured to display the decoded video data.

19. A method of encoding video data, the method comprising:
encoding a first block of video data in a first frame of video data, the first block of video data being encoded relative to a first predictive block in the first frame of video data, the first predictive block being identified by a block vector; and
encoding the block vector using a motion vector prediction process and a same motion vector candidate list as used for decoding a motion vector, wherein the motion vector is used to identify an inter-frame predictive block for a second block of video data coded using inter coding.

20. The method of claim 19, further comprising:
encoding the second block of video data; and
encoding the motion vector using the motion vector prediction process and the motion vector candidate list.

21. The method of claim 20, further comprising:
encoding the first block of video data using the first predictive block and the block vector; and
encoding the second block of video data using the inter-frame predictive block and the motion vector.

22. The method of claim 20, wherein encoding the motion vector further comprises:
adding at least one of a candidate block vector and a candidate motion vector from one or more neighboring blocks in the motion vector candidate list to a motion vector predictor candidate list for the motion vector prediction process.

23. The method of claim 19, wherein encoding the block vector further comprises:
   adding at least one of a candidate block vector and a candidate motion vector from one or more neighboring blocks in the motion vector candidate list to a motion vector predictor candidate list for the motion vector prediction process.

24. The method of claim 23, further comprising:
   determining that a respective candidate block vector or a respective candidate motion vector is unavailable; and
   adding a default motion vector to the motion vector candidate list.

25. The method of claim 24, further comprising:
   determining the default motion vector from a predetermined set of default motion vectors, the predetermined set not including a zero vector (0, 0).

26. The method of claim 19, wherein encoding the block vector further comprises:
   adding only candidate block vectors from neighboring blocks in the motion vector candidate list to a motion vector predictor candidate list for the motion vector prediction process.

27. An apparatus configured to decode video data, the apparatus comprising:
   means for receiving a first block of video data in a first frame of video data, the first block of video data being encoded relative to a first predictive block in the first frame of video data, the first predictive block being identified by a block vector; and
   means for decoding the block vector using a motion vector prediction process and a same motion vector candidate list as used for decoding a motion vector, wherein the motion vector is used to identify an inter-frame predictive block for a second block of video data coded using inter coding.

28. The apparatus of claim 27, wherein the means for decoding the block vector further comprises:
   means for adding at least one of a candidate block vector and a candidate motion vector from one or more neighboring blocks in the motion vector candidate list to a motion vector predictor candidate list for the motion vector prediction process.

29. The apparatus of claim 28, further comprising:
   means for determining that a respective candidate block vector or a respective candidate motion vector is unavailable;
   means for adding a default motion vector to the motion vector candidate list; and
   means for determining the default motion vector from a predetermined set of default motion vectors, the predetermined set not including a zero vector (0, 0).

30. The apparatus of claim 27, wherein the means for decoding the block vector further comprises:
   means for adding only candidate block vectors from neighboring blocks in the motion vector candidate list to a motion vector predictor candidate list for the motion vector prediction process.

\* \* \* \* \*